United States Patent [19]
Kannegundla et al.

[11] Patent Number: 5,489,945
[45] Date of Patent: Feb. 6, 1996

[54] TIMING LOGIC SYSTEM AND METHOD FOR SELECTABLY CONTROLLING A HIGH RESOLUTION CHARGE COUPLED DEVICE IMAGE SENSOR OF THE TYPE HAVING TWO LINE PIXEL REGISTERS TO PROVIDE A HIGH RESOLUTION MODE AND ALTERNATIVELY A TELEVISION RESOLUTION MODE OF PICTURE IMAGING

[75] Inventors: Ram Kannegundla, Rochester; Win-Chyi Chang, Penfield, both of N.Y.

[73] Assignee: Eastman Kodak Company, Rochester, N.Y.

[21] Appl. No.: 305,244

[22] Filed: Sep. 13, 1994

[51] Int. Cl.$^6$ ............................. H04N 5/06; H04N 5/067
[52] U.S. Cl. ..................... 348/521; 348/322; 348/312; 348/222; 348/522; 348/555
[58] Field of Search ..................... 348/322, 294, 348/311, 312, 222, 305, 521, 522, 524, 550, 500, 555, 446; 358/909.1; H04N 5/06, 5/067

[56] References Cited

U.S. PATENT DOCUMENTS

| | | | |
|---|---|---|---|
| 4,949,183 | 8/1990 | Stevens | 358/213.23 |
| 5,264,939 | 11/1993 | Chang | 358/213.22 |
| 5,321,509 | 6/1994 | Kannegundla | 348/222 |

OTHER PUBLICATIONS

Bernard Grob, Basic Television and Video Systems, McGraw Hill, N.Y., 5th Ed., 1984.

*Primary Examiner*—James J. Groody
*Assistant Examiner*—Sherrie Hsia
*Attorney, Agent, or Firm*—James D. Leimbach

[57] ABSTRACT

A timing logic system which includes a generic television-standard timing generator selectably provides precisely timed horizontal and vertical control signals for controlling the operation of a high resolution charge coupled device (CCD) image sensor of the type having two line pixel registers in a high resolution mode of picture imaging. Alternatively, the timing logic system selectably provides precisely timed horizontal and vertical control signals, and a precisely timed display field control signal applied to a switch mechanism, for controlling the operation of the high resolution CCD image sensor in a television resolution mode of picture imaging in accordance with a television standard, for example, the NTSC standard. The timing logic system also provides sync and control signals to a television-standard display in the television mode of operation. In both the high resolution mode and the television mode of operation, the timing logic system provides the respective horizontal and vertical control signals to the CCD image sensor so that both line pixel registers are operative.

9 Claims, 10 Drawing Sheets

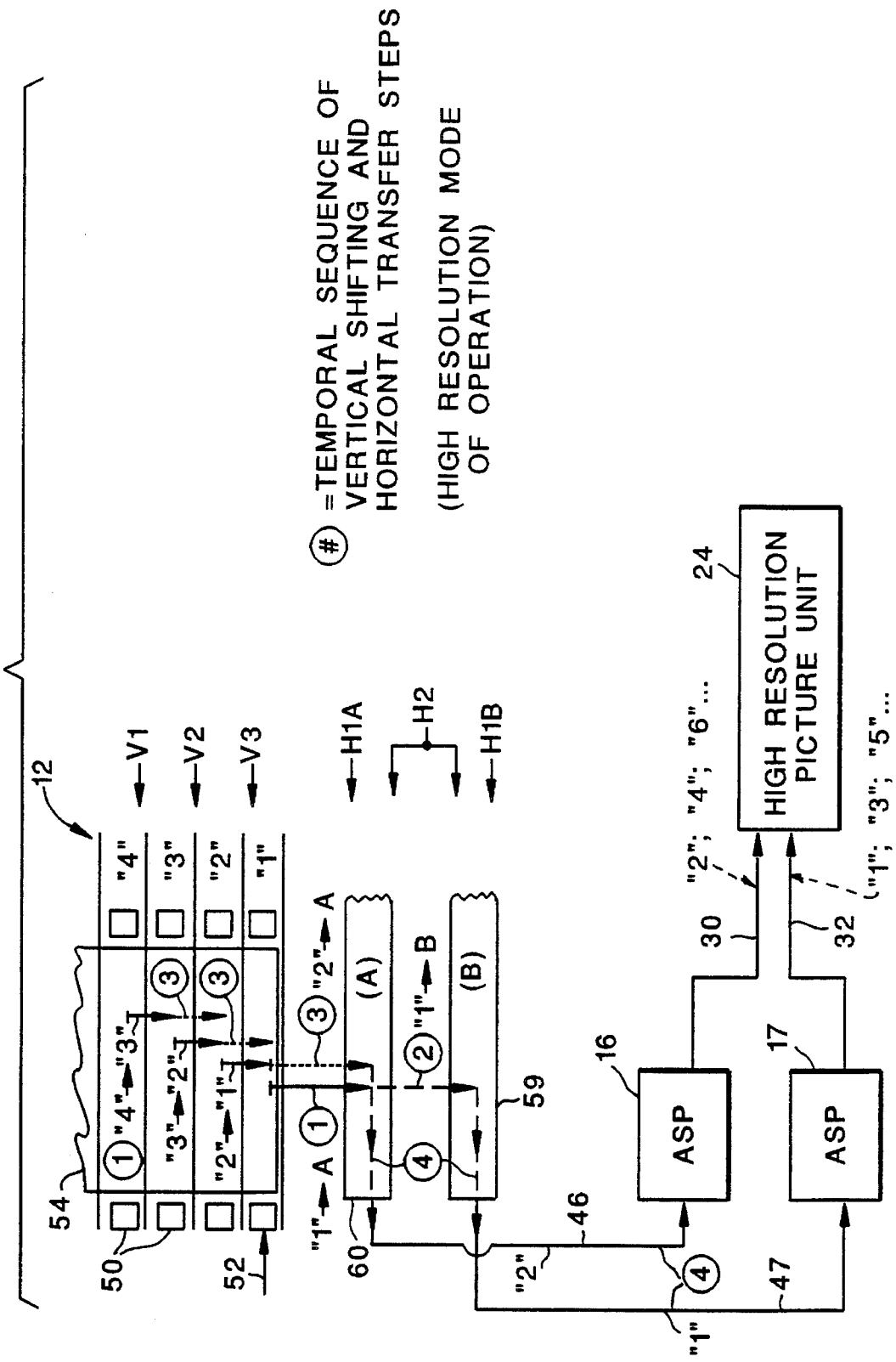

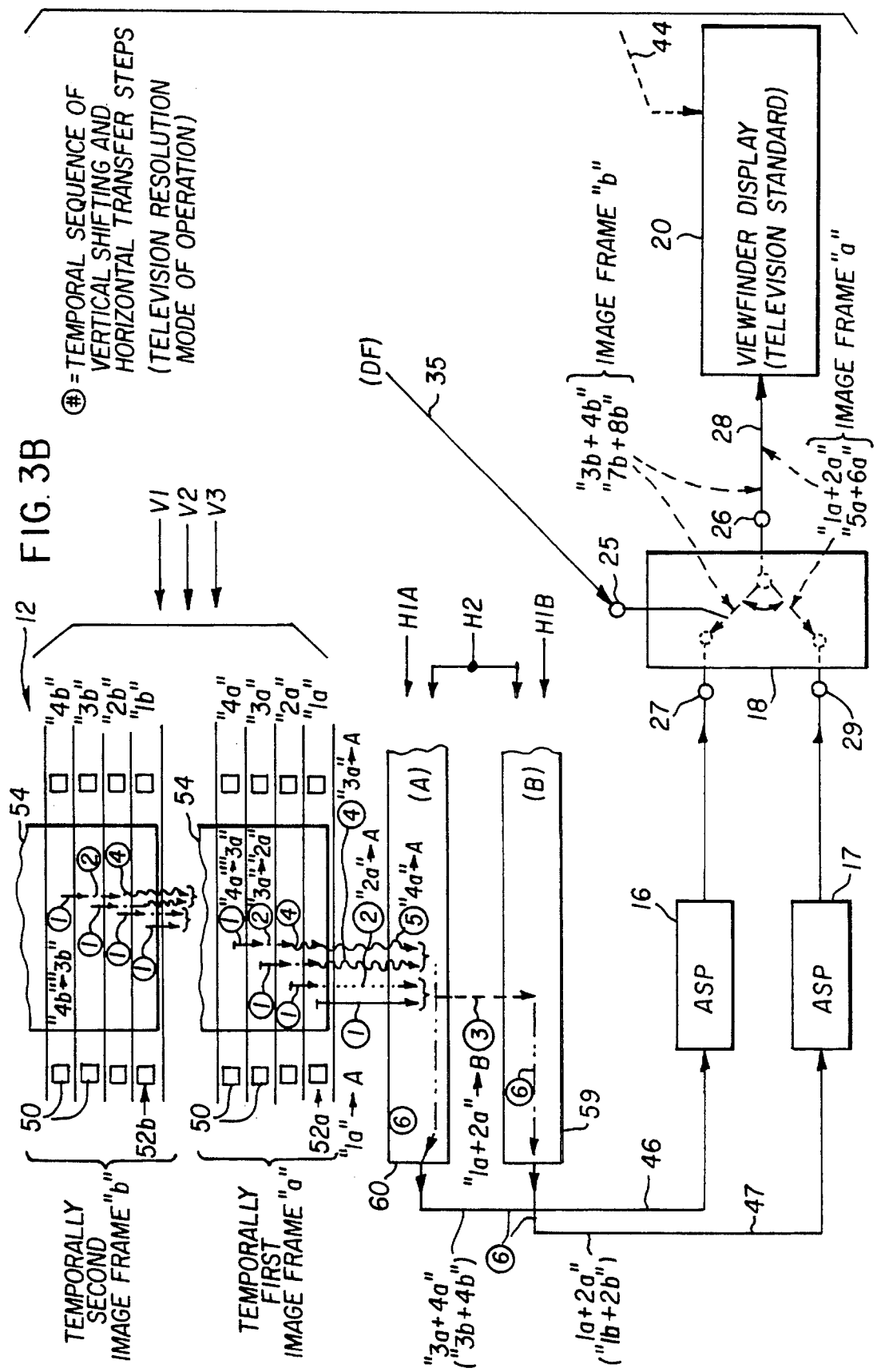

TIMING LOGIC SYSTEM AND METHOD FOR SELECTABLY CONTROLLING A HIGH RESOLUTION CHARGE COUPLED DEVICE IMAGE SENSOR OF THE TYPE HAVING TWO LINE PIXEL REGISTERS TO PROVIDE A HIGH RESOLUTION MODE AND ALTERNATIVELY A TELEVISION RESOLUTION MODE OF PICTURE IMAGING

CROSS REFERENCE TO RELATED APPLICATIONS

Reference is made to commonly assigned application Ser. No. 08/005,323, filed Jan. 15, 1993, entitled "Improved Logic System and Method For Controlling Any One Of Different Charge Coupled Device Image Sensors to Provide Video Image Signals in Accordance With a Television Standard" by Ram Kannegundla and application Ser. No. 08/033,908, filed Mar. 19, 1993, entitled "Improved Apparatus and Method For Controlling A High Resolution Charge Coupled Device Image Sensor To Provide Alternative Modes Of Picture Imaging" by Ram Kannegundla et al the disclosures of which are incorporated herein by reference.

FIELD OF THE INVENTION

This invention relates generally to a timing logic system and method for selectably controlling a high resolution charge coupled device (CCD) image sensor to provide video images for display in accordance with a television standard and alternatively to provide for a high resolution image reproduction, and the invention relates more particularly to a timing logic system which uses a conventional commercially available television-standard timing generator to provide control signals to a CCD image sensor having over one thousand lines of pixels and being of the type having two line pixel registers such that the CCD image sensor can be selectably controlled in a television resolution mode compatible with a television standard and alternatively in a high resolution mode for high resolution image reproduction.

BACKGROUND OF THE INVENTION

Recent years have seen the rapid development of CCD image sensors and their present widespread use in imaging systems for both amateur and professional applications. Their small size, electrical efficiency, cost effectiveness, etc., have made CCD image sensors the imaging units of choice not only for inexpensive consumer camcorders which provide image information that can be displayed on a television set, but for more critical uses where much higher picture resolution is needed, such as, for example, in digital color printing applications. Several types of CCD image sensors, and numerous variations thereof, are commercially available from various manufacturers. In one way, these types may be conveniently classified into two classes, namely a "high resolution" class of CCD image sensors and a "low resolution" or "television resolution" class.

A "high resolution" CCD image sensor, frequently also referred to as a "mega-pixel" CCD image sensor, has at least a total of one million picture cells ("pixels"), typically arranged in at least one thousand horizontal lines or rows (comprising in totality a "vertical" image picture frame) with each line or row containing at least one thousand pixels. For example, a high resolution CCD image sensor may have 1024 horizontal lines and 1024 cells (pixels) per line.

A "television resolution" or "low resolution" CCD image sensor also has its picture cells ("pixels") arranged in a number of horizontal lines or rows, with the number of lines approximating the number of horizontal lines required for a display which functions in accordance with a television standard. In the United States and a number of other countries that television standard, as established by the National Television Standards Committee (NTSC), calls for a complete vertical television display frame to have a total of 525 horizontal lines, made up of two "interlaced" fields ("odd" and "even" fields) of about 262.5 horizontal lines each. Thus, a "television resolution CCD image sensor typically has a number of horizontal pixel lines or rows which approaches or equals the 525 NTSC television standard horizontal lines. For example, a television resolution CCD image sensor may have 484 horizontal lines or rows of pixels (reasonably approximating the 525 NTSC lines), and each horizontal line of pixels may contain a total of 768 "active" (i.e., photo-sensitive) pixels.

Each one of the numerous design variations of the two classes of CCD image sensors, as classified above, is aimed at controlling the operation of a sensor in one particularly advantageous manner. For example, a high resolution CCD image sensor having as a design variation the inclusion of a so-called "electronic clock gate" (ECG array) and a single so-called "horizontal shift register" has to be controlled in its operation entirely differently compared to a high resolution CCD image sensor which has been designed to include two horizontal shift registers, and without an ECG array.

When it is desired to control a high resolution CCD image sensor (dedicated to be optimally controlled and operated in one particular manner in accordance with the one particular design) in an alternative mode, for example, in a "television resolution" mode, as compared to an inherent "high resolution mode," the level of complexity associated with providing appropriately timed and precisely related control signals to the sensor (for proper sensor function in the alternative mode) increases significantly. That increased level of complexity (for example, an entirely different assembly of electrical control circuits designed and dedicated for each one of the two desired modes of operation of the sensor) frequently completely negates the cost-effectiveness of the high resolution image sensor.

Thus, while it is possible, in principle, to operate an economically manufactured high resolution CCD image sensor not only in a high resolution mode for which it was inherently designed, but also in a low resolution mode (television resolution mode), it has not been possible heretofore to provide relatively economically a timing logic system for selectably controlling a high resolution CCD image sensor of the type having two horizontal shift registers (and without an ECG array) to provide a high resolution mode and alternatively a television resolution mode of picture imaging.

One particular apparatus and method for operating and controlling one particular high resolution CCD image sensor in a low resolution ("television resolution") mode of operation is disclosed in U.S. Pat. No. 5,264,939, issued on Nov. 23, 1993. That particular high resolution CCD image sensor (16), depicted in a FIG. 1 of the above patent, has two horizontal shift registers (26, 28) and an electronic clock gate (24). The image sensor (16) is controlled by several circuits (30; 32; 40; and 64) such that in the low resolution ("television resolution") mode of its operation the electronic clock gate (24) selectively "dumps" or discards certain rows of pixel information provided by the CCD image sensor (16), and rows of pixel information retained (i.e., not dumped) are shifted to only one horizontal shift register (26), and are shifted from there to a video display (42) to form an "interlaced" viewing signal in accordance with a television standard (NTSC-standard).

Alternatively, if it is desired to operate and control the particular high resolution CCD image sensor (16) in its high resolution mode, the circuits (30; 32; 40; and 64) are modified or adapted to provide control signals to the image sensor such that the electronic clock gate (24) is by-passed (i.e., made to be non-functional), and both horizontal shift registers (26; 28) are "activated" to receive and output therefrom all of the rows of pixel information of the image sensor (16).

Thus, U.S. Pat. No. 5,264,939 discloses the use of a number of discrete circuits (30; 32; 40; and 64) to generate an interlaced (i.e., television compatible) viewing signal at an output of a high resolution CCD image sensor of the type having an ECG array, and using only one of two horizontal shift registers in the generation of the viewing signal.

With respect to a "television resolution" CCD image sensor, such a sensor can, of course, be operated in a "television resolution" mode in which the sensor provides the requisite outputs of "odd" and "even" lines of pixels to form the "odd" and "even" interlaced display fields comprising the display frames on a standard television set. Alternatively, such a CCD image sensor may be controlled to output the signals from each row of pixels sequentially row-by-row.

However, a "television resolution" CCD image sensor fundamentally cannot provide a "high resolution" output.

The relatively complicated way of displaying television images in accordance with the NTSC standard is an outgrowth of the development of commercial broadcast television over the past fifty years to the present time. However, this way has served the test of time and is not easily departed from. A much more complete discussion of television (for black and white as well as color) together with the timing, blanking, synchronizing (sync) signals, etc. required by the NTSC "standard" is given in a book entitled *Basic Television and Video Systems*, by Bernard Grob, published by McGraw-Hill, Inc., Fifth Edition, 1984.

CCD image sensors are well known in the art, and will be briefly described hereinafter for a high resolution CCD image sensor of the type having two horizontal shift registers (line pixel registers). Such a CCD image sensor may have at the beginning of each horizontal line of cells a small number of cells (termed "Z ref" cells) used for determining a zero signal level. There are also a small number of cells (termed "D ref" cells) for determining a "dark" signal reference level, followed by a large number of "active" cells in the line for producing pixel image signals, and finally at the end of the line there are a few additional "Z ref" cells. One such high resolution CCD image sensor commercially available from the Eastman Kodak Co. (Part No. KAI-1000) has a total of 1032 cells in each horizontal line, with 2 "Z ref" cells at the beginning of the line, followed by 10 "D ref" cells, followed by 1014 "active" cells, followed by 6 "Z ref" cells at the end of the line, a total of 1032 cells. There are 1024 horizontal lines of these cells arranged in vertical columns.

As is well known, a television frequency sub-carrier signal (hereinafter termed "fsc") provides for the decoding and display in proper sequence of the color-components (e.g., red, green and blue) of standard television image signals. This is also explained in detail in the above-identified book by Bernard Grob. To synchronize the pixel image signals in each horizontal line of cells of a CCD image sensor with a television standard, the number of cells in a horizontal line is made a convenient multiple of the television frequency subcarrier ("fsc"). This will be explained in greater detail hereinafter. For the NTSC "standard", the "fsc" is 3.5795 MHz.

The synchronizing (sync) and control signals for a standard television system (e.g., NTSC) are well suited to the needs of video monitors (having lower resolution than the high resolution CCD image sensor is capable of providing) such as used in camcorder viewfinder displays. Generic television-standard timing generators specifically designed for producing these "standard" sync and control signals are commercially available off-the-shelf at low cost from a number of companies for use in conjunction with CCD image sensors designed inherently as "television resolution sensors." However, the standard sync and control signals produced by these commercially available timing generators are not directly usable as the vertical and horizontal control signals needed for a high resolution CCD image sensor of the type having two line pixel registers in either a high resolution mode or in a television resolution mode of operation.

As indicated previously, it is highly desirable to provide a simple, inexpensive and versatile timing logic system which incorporates a relatively inexpensive generic television-standard timing generator to optimally control the operation of a high resolution CCD image sensor of the type having two line pixel registers. The timing logic system should provide vertical and horizontal control signals for high resolution readout of the lines of video signals of the CCD image sensor from its two line pixel registers and, alternatively, control signals as needed for viewing in real time of video images in a television-standard display, these video images derived from the high resolution CCD image sensor of the type having two line pixel registers.

SUMMARY OF THE INVENTION

In accordance with the present invention, in one aspect thereof, there is provided a timing logic system for controlling a high resolution CCD image sensor of the type having two line pixel registers and having a much larger number of horizontal lines of an image frame than the number of lines per frame provided by a standard for television. The timing logic system provides on the one hand for high resolution outputting of video signals from the CCD image sensor in a high resolution mode optimized for use by a high resolution picture unit. In this high resolution mode, a single horizontal line of an image frame is outputted at the same time from each one of the two line pixel registers, one line being outputted from one line pixel register while the next consecutive single horizontal line of the image frame is outputted from the other of the two line pixel registers. This outputting of a single consecutive line per pixel register continues until all horizontal lines of the image frame have been outputted in this manner. The timing logic system also provides an "interlaced" television resolution mode of outputting of lines of video signals from the CCD image sensor so that they are directly displayable on a television viewfinder display. In this "interlaced" television resolution mode, a pair of two consecutive horizontal lines of a first image frame is outputted as a "combined" or "composite" line from one of the two line pixel registers, and the next consecutive pair of two horizontal lines of the first image frame is outputted at the same time as a "combined" line from the other of the two line pixel registers. However, switching means controlled by the timing logic system "connects" only one of the "combined" line outputs (i.e., the outputs of only one of the two line pixel registers) to the viewfinder display during the outputting of the first image frame, thereby forming a first display field of the display. The "combined" line outputs from the other line pixel register are not utilized in forming the first display field. During the outputting of the next consecutive image frame, i.e., the second image frame, the switching means is controlled to "connect" the "combined" line outputs of only the other one of the two line pixel registers to the viewfinder display, thereby forming an "interlaced" second display field of the display. The "combined" line outputs from the one line pixel register are not utilized in forming the second display field. Thus, in this television resolution mode, a first field of the television display comprises alternate line pairs of a first image frame of the CCD image sensor, and an "interlaced" second field of the television display comprises alternate line pairs of a second image frame of the sensor, such that one full frame (two fields) of the display comprises two image frames of the sensor.

This timing logic system has a generic television-standard timing generator which produces standard sync and control signals as required by a television display. The generic timing generator is driven by a frequency generator whose frequency is made a multiple of a standard frequency sub-carrier ("fsc"). A pixel clock generator, also driven by the frequency generator, provides a pixel clock each cycle of which has a pre-determined number of pixel timing pulses corresponding to the number of cells (pixels) per horizontal line of the high resolution CCD image sensor being used with the timing logic system. Signals from the timing generator and the pixel clock generator are applied to a small number of timers and logic units to provide horizontal, vertical, and other control signals required by the CCD image sensor for its two alternative modes of operation. Certain ones of these timers and logic units are selectably controlled to provide horizontal and vertical control signals as needed for a high resolution noninterlaced readout of pixel image signals from the high resolution CCD image sensor of the type having two line pixel registers. Alternatively, the timers and logic units are selectably controlled to provide horizontal, vertical, and other control signals in accordance with a television resolution ("interlaced") mode of readout of the pixel image signals in which the signals are directly viewable on a standard television display having far fewer horizontal lines than the high resolution CCD image sensor.

In accordance with another aspect of this invention, there is provided a method for controlling a high resolution CCD image sensor of the type having two line pixel registers and having a large number of horizontal lines of pixel image signals per image frame to obtain in a television resolution mode of operation a reduced number of lines of video signals synchronized in interlaced first and second display fields for display in accordance with a television standard and alternatively to obtain all of the lines of pixel image signals from the CCD image sensor outputted from the line pixel registers for utilization by a high resolution picture unit. The method comprises the steps of generating standard sync and control signals as required by a standard television display, generating a pixel clock, generating a plurality of timed pulses referenced to the standard signals, generating three horizontal CCD control signals from a logical combination of the pixel clock and ones of the timed pulses, generating vertical CCD control signals having a selectable number of vertical shift pulses from a logical combination of ones of the timed pulses, generating line pixel register shift control signal pulses having a selectable temporal relationship to the vertical shift pulses from a logical combination of ones of the vertical shift pulses and the pixel clock, generating vertical CCD control signals having a fixed number of frame shift pulses from a logical combination of ones of the timed pulses and the standard signals, generating display field control signals for displaying of selected numbers of alternate pairs of consecutive horizontal lines of pixel image signals outputted from a first one of the two line pixel registers for a first vertical image frame of a picture through a switch means controlled by a first one of the display field control signals to form a first display field of a standard television display, and outputted from a second one of the two line pixel registers for a consecutive second vertical image frame of the picture through the switch means controlled by a second one of the display field control signals to form a second display field interlaced with the first display field of the television display, the display field control signals generated from a logical combination of ones of the standard signals and timed pulses, and selecting the numbers of vertical shift pulses and the temporal relationship thereto of the line pixel register shift control signal pulses in accordance with a high resolution mode of outputting single horizontal lines of pixel image signals from each one of the two line pixel registers of the CCD image sensor and alternatively selecting the numbers of vertical shift pulses, the temporal relationship thereto of the line pixel register shift control signal pulses and the display field control signals in accordance with a television resolution mode of outputting the alternate pairs of consecutive lines of pixel image signals in the interlaced first and second display fields of the television standard.

In accordance with yet another aspect of the invention, there is provided a timing logic system for generating synchronizing (sync) and control signals in accordance with a television standard and for selectably generating horizontal, vertical, and display field control signals as required by a high resolution charge coupled device (CCD) image sensor of the type having two line pixel registers and having a large number of horizontal lines of pixel image signals per vertical image frame for a high resolution mode of utilizing all of the lines of pixel image signals in a high resolution picture unit, and alternatively for a television resolution mode of utilizing alternate pairs of consecutive lines from each of two consecutive image frames so that the image pixel signals are viewable directly on a standard television display. The timing logic system comprises timing generator means, pixel clock generating means, and selectably controlled timing and logic means. The timing generator means generates standard sync and control signals in accordance with a television standard, and is referenced to a standard frequency. The pixel clock generating means provides pixel clock signals having repeating cycles each of which has a pre-determined number of pixel timing pulses in accordance with requirements of the CCD image sensor. The pixel clock generating means is referenced to the standard frequency. The selectably controlled timing and logic means, which is driven by pixel clock and standard sync and control signals, generates horizontal, vertical, and display field control signals for the CCD image sensor having the two line pixel registers as needed for a high resolution mode of utilizing of all of the horizontal lines of pixel image signals of a vertical frame as single lines from the CCD image sensor and alternatively as needed for a television resolution mode of utilizing alternate pairs of consecutive lines of pixel image signals from each one of two consecutive image frames to form interlaced first and second display fields of vertical display frames of a standard television display in which the first and second display fields are selected by a switch means controlled by the display field control signals.

The invention will be better understood from a consideration of the following detailed description given in conjunction with the accompanying drawings and claims.

BRIEF DESCRIPTION OF THE DRAWINGS

FIG. 3A shows schematically the sequential disposition into and readout from each one of two line pixel registers of single horizontal lines of pixel image signals of a high resolution CCD image sensor in a high resolution mode;

FIG. 3B indicates schematically the sequential disposition into and readout from each one of two line pixel registers of pairs of alternate consecutive horizontal lines of pixel image signals for each of two consecutive image frames of a high resolution CCD image sensor in a television resolution mode;

DETAILED DESCRIPTION

Figure 1:
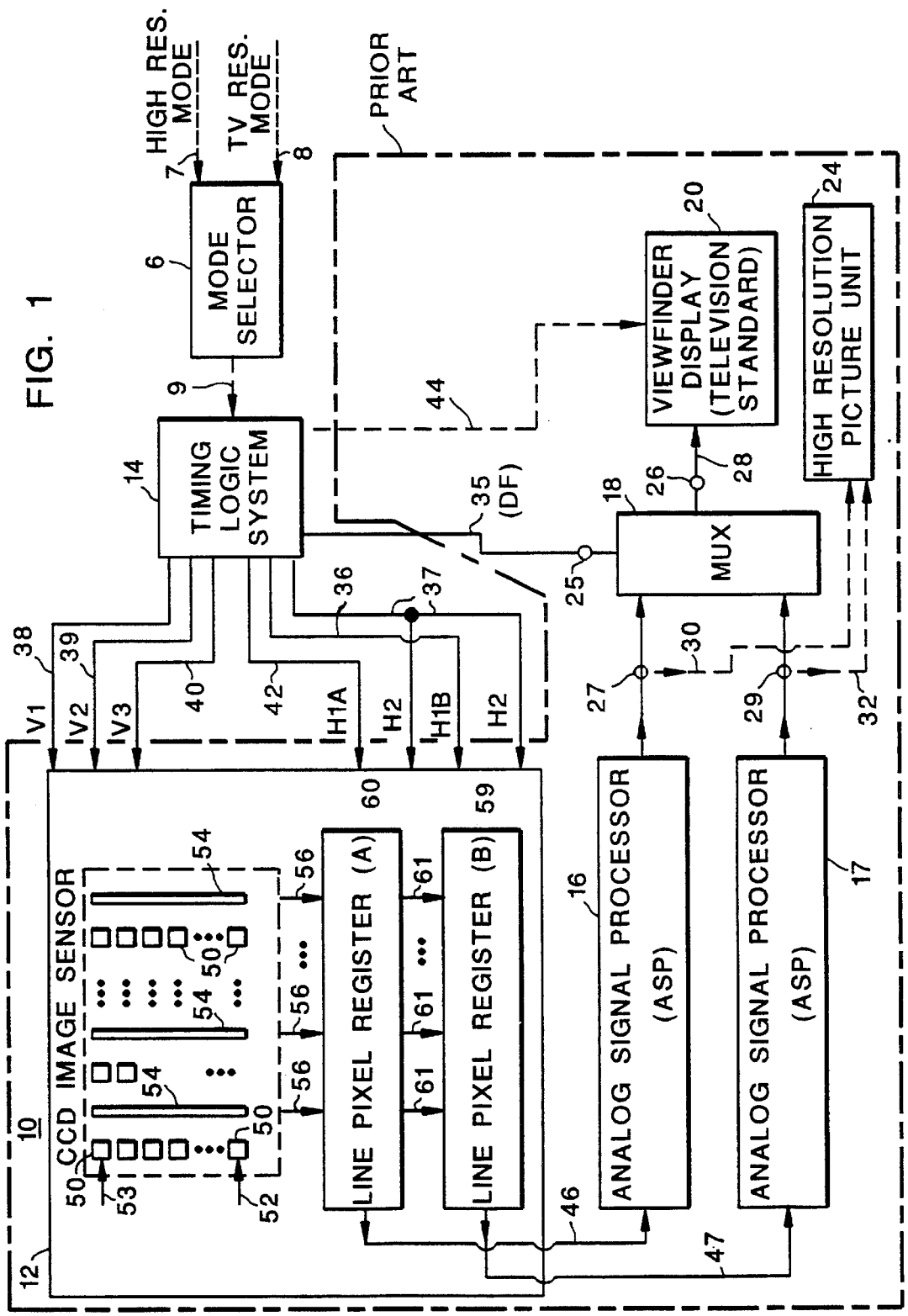
FIG. 1 is a schematic block diagram showing a timing logic system in accordance with the present invention for controlling a known high resolution charge coupled device (CCD) image sensor of the type having two line pixel registers incorporated in a prior an imaging system.

Referring now to FIG. 1, there is shown a schematic block diagram of a novel timing logic system 14 including a mode selector 6, a prior art imaging system 10 comprising a known CCD image sensor 12 of the type having two line pixel registers 59 and 60 (shown within a solid-line rectangle) and commercially available from Eastman Kodak Company with a designation "KAI-1000" and disclosed in U.S. Pat. No. 4,949,183, which is entitled, "Image Sensor Having Multiple Horizontal Shift Registers," issued Aug. 14, 1990, two analog signal processors (ASP) 16 and 17 which are well known in the art, a multiplexer switch 18 well known in the art, a television viewfinder display 20 well known in the art which uses a television standard, and a high resolution picture unit 24 well known in the art shown as having two inputs. Image signals applied to the picture unit 24 may, for example, be printed out as a high resolution color picture (not shown). Picture unit 24 may include a frame store at each of its inputs as is well known in the art.

The multiplexer switch 18 is an "electronic" switching device well known in the art. The switch 18 has one input terminal 27 connected to an output of a first analog signal processor ASP 16, and has another input terminal 29 connected to an output of a second ASP 17. An output terminal 26 of the multiplexer switch 18 can be thought of as the "sweeper arm" of a mechanical "single pole double throw switch," and is connected via a lead 28 to an input of the viewfinder display 20. Multiplexer switch 18 has a control input terminal 25 connected via a lead 35 to the timing logic system 14. The timing logic system 14 provides via lead 35 precisely controlled display field control signals DF to the multiplexer switch 18 in the television resolution mode of the CCD image sensor 12, so that the output signals of only one of the ASP 16 and ASP 17 are "connected" to the input of the display 20 during a signal readout of an entire first image frame of the CCD image sensor 12 to form a first display field (for example, an "odd" field), and so that the output signals of only the other one of the ASP 16 and ASP 17 are "connected" to the input of the display 20 during a signal readout of an entire second image frame to form an "interlaced" second display field (for example, an "even" field) of a display frame in accordance with a television standard. In the high resolution mode of CCD image sensor 12, the multiplexer switch 18 is either not actuated (i.e., the output terminal 26 is neither connected to the input terminal 27 nor to the input terminal 29) or the switch 18 is removed altogether. In that high resolution mode, a lead 30 (shown as a dashed line) connects the output of the first ASP 16 to a first input of the high resolution picture unit 24, and the output of the second ASP 17 is shown connected via a lead 32 to a second input of the picture unit.

A mode selector 6 is schematically indicated as connecting an output thereof via a lead 9 to the timing logic system 14. The mode selector 6 shows schematically a high resolution mode input lead 7 and a television resolution mode input lead 8. The mode selector 6 selectably provides control signals to the timing logic system 14, the control signals being reflective of control signals on input lead 7 and alternatively on input lead 8.

The timing logic system 14, which is described in detail hereinafter, applies horizontal control signals H1A, H1B, and H2 to the CCD image sensor 12 via leads 42, 36, and 37, respectively. The timing logic system also applies vertical control signals V1, V2, and V3 to the CCD image sensor 12 via leads 38, 39 and 40, respectively. Sync and control signals (not shown) in accordance with a television "standard" may be applied by the timing logic system 14 to the viewfinder display 20 via a multi-channel cable 44 (shown by a dashed-line). Pixel image signals outputted from a first line pixel register (A) designated at 60 of the CCD image sensor 12 are applied via a lead 46 to an input of the first ASP 16. Pixel image signals outputted from a second line pixel register (B) designated at 59 of the CCD image sensor 12 are applied via a lead 47 to an input of the second ASP 17.

The additional distinctions "(A)" and "(B)" with respect to first line pixel register (A) 60 and second line pixel register (B) 59 are provided to clarify the description of the function of these two line pixel registers in terms of the "horizontal" control signals H1A, H1B, and H2 applied thereto by the timing logic system 14 in accordance with the present invention, as described in greater detail hereinafter.

The CCD image sensor 12 has drive circuits (not shown) which are well known in the art and which are controlled by the horizontal control signals H1A, H1B, and H2 (H1B and H2 being complements of each other). The drive circuits are also controlled by the vertical control signals V1 and V2 (which are complements of each other), and by the vertical control signal V3. These horizontal and vertical control signals, and their relationships to each other, and how they are generated by the timing logic system 14, are described in detail hereinafter. The horizontal and vertical control signals selectably (via the mode selector 6) provide for outputting a single line of the lines of pixel image signals of each image frame from one of the two line pixel registers and for outputting at the same time the next single line from the other one of the two line pixel registers of the CCD image sensor 12 in a high resolution mode of operation. Alternatively, in a television resolution mode of operation, the horizontal and vertical control signals selectably provide in conjunction with the multiplexer switch 18 for utilizing alternate pairs of consecutive lines as a "composite" line of a first image frame from one of the two line pixel registers and for utilizing alternate pairs of consecutive lines as a "composite" line of a next image frame from the other one of the two line pixel registers, whereby a display in accordance with a television standard is achieved.

The CCD image sensor 12, as is well known, has a multitude of closely spaced cells 50 arranged in horizontal lines and vertical columns. A first horizontal line of cells 50 is indicated by a horizontal arrow 52, and so on to a last horizontal line of cells indicated by a horizontal arrow 53. These horizontal lines of cells 50 comprise a vertical frame of a picture being imaged by the CCD image sensor 12. In one illustrative sensor 12 there are 1024 horizontal lines of cells 50.

Associated with each vertical column of cells 50 is a respective one of vertical shift registers 54 (only three are shown). In each vertical shift register 54 there are memory positions (not shown) adapted to receive at a selected instant all of the pixel image signals of the cells 50 in a given column. This precisely timed shifting of the pixel image signals from all of the cells 50 into the vertical shift registers 54 is described in greater detail hereinafter.

After the vertical registers 54 have been loaded with all of the horizontal lines of pixel image signals, those pixel image signals (corresponding to the first horizontal line 52) then in the first memory position (not shown) of the vertical registers 54 are, as indicated by downward arrows 56, shifted in one cycle in parallel to respective positions (not shown) of a first line pixel register(A) 60. The shifting of the first horizontal line 52 of pixel image signals into the first line pixel register 60 "advanced" a previously second line of pixel image signals in the vertical registers 54 into a "first line position," and "advanced" a previously third line into a "second line position" in the vertical registers 54, i.e., each previous position of a horizontal line in the vertical registers 54 is "advanced" by one line position in the direction toward line pixel register 60.

In the high resolution mode of operation of a CCD image sensor of the type having two line pixel registers, such as a first line pixel register (A) 60 and a second line pixel register (B) 59 (having respective positions identical to the respective positions of the first line pixel register 60), the pixel image signals corresponding to the first horizontal line 52 are shifted in one cycle in parallel from the first line pixel register (A) 60 into the second line pixel register (B) 59, as indicated by downward arrows 61, by a line pixel register shift pulse precisely controlled and part of the horizontal control signal H1A as will be described in detail hereinafter. Following a precisely timed interval, the pixel image signals now in the "first line position" of the vertical registers 54 are shifted from that "first line position" into the first line pixel register (A) 60. Thus, at this "instant," the line pixel image signals of the originally first horizontal line 52 are now disposed in the second line pixel register (B) 59, and the line pixel image signals of the previously second line of pixel image signals in the vertical registers 54 (having "advanced" into the "first line position") are now disposed in the first line pixel register (B) 60.

The shifting of the pixel image signals corresponding to the first line 52 from the first line pixel register (A) 60 into the second line pixel register (B) 59 is "enabled" by the precisely timed line pixel register shift pulse of the signal H1A applied to the first line pixel register (A) 60 in conjunction with a signal H2, as described in greater detail hereinafter.

There is a respective memory position (not shown) in each of the first (A) and second (B) line pixel registers 60 and 59, respectively, for receiving the output of each one of the vertical registers 54.

In the high resolution mode of outputting the single lines of pixel image signals from each of the two line pixel registers, the horizontal control signals H1A and H2 (applied to the line pixel register (A) 60), and the horizontal control signals H1B and H2 (applied to the line pixel register (B) 59) are now provided with synchronized "horizontal" clock pulses such that the pixel image signals are now clocked "horizontally" out of the two line pixel registers 59 and 60 pixel-by-pixel and at the same time, and applied via the respective leads 47 and 46 to the respective analog signal processors ASP 17 and ASP 16, and via the respective leads 32 and 30 to the two inputs of the high resolution picture unit 24. This clocking out, also referred to as "horizontal readout," is precisely controlled by the control signals H1A, H1B and H2 provided by the timing logic system 14, as will be explained in more detail hereinafter. If the horizontal readout is performed, for example, at a frequency of about 21 MHz (6 "fsc"), the high resolution mode of operation of the high resolution CCD image sensor 12 can provide thirty full image frames per second to the high resolution picture unit 24.

In the high resolution mode, the sequential line-by-line shifting of pixel image signals into the first and second line pixel registers 60 and 59, respectively, and the readout from these line pixel registers continues until the last horizontal line 53 and a next to last horizontal line of pixel image signals have been outputted as single lines and pixel-by-pixel to the ASP 16 and to the ASP 17, respectively. At this point the vertical registers 54 are now empty. Then another precisely timed vertical control signal (V3) applied to the CCD image sensor 12 simultaneously shifts all of the pixel image signals of the next image frame from all of the horizontal lines of cells 50 into the vertical registers 54. After this, the above-described sequence is repeated in clocking the pixel image signals out of the first and second line pixel registers 60 and 59, respectively, until all of the horizontal lines of that image frame of the CCD image sensor 12 have been outputted, and so on. FIG. 3A shows schematically the above described sequential disposition into, and horizontal readout from each one of the two line pixel registers 59 and 60 of single horizontal lines of pixel image signals in the high resolution mode, using the first four lines of an image frame as an example.

In contrast to the above described high resolution mode, the pixel image readout in a television resolution mode from a CCD image sensor 12 of the type having two line pixel registers 59 and 60, can best be described by reference to the schematic diagram of FIG. 3B which depicts the disposition into and horizontal readout from the two horizontal line pixel registers.

In this television resolution mode of operation of the high resolution CCD image sensor 12, the timing logic system 14 provides the vertical control signals V1 and V2 and the horizontal control signals H1A, H2, and H1B to the image sensor 12 of FIG. 1 in such a manner that the following sequence of vertical shifting of pixel image lines from the vertical shift registers 54 into the line pixel registers (A) 60 and (B) 59 and horizontal readout therefrom occurs:

The first line "1" (line 52) of pixel image signals is shifted "vertically" from the vertical registers 54 into the first line pixel register (A) 60, followed by the next consecutive line "2" (which has "advanced" into the "first line position"). The pair of the consecutive lines "1" and "2" now disposed in the first line pixel register (A) 60 can be viewed as one "combined" or "composite" line of pixel image signals. A line pixel register shift pulse precisely controlled and part of the horizontal control signal H1A, "enables" the shifting of this first "combined" line of pixel image signals from the first line pixel register (A) 60 into the second line pixel register (B) 59 in one cycle in parallel. Now, the next consecutive third line "3" of pixel image signals (having "advanced" into the "first line position") is "vertically" shifted from the vertical registers 54 into the first line pixel register (A) 60, followed by the next consecutive line "4" (which is now in the "first line position"). This pair of the consecutive lines "3" and "4" now disposed in the first line pixel register (A) 60 can be viewed as a second "combined" or "composite" line of pixel image signals.

Thus, at this "instant," the pixel image signals corresponding to original pixel lines "1" and "2" in the vertical shift registers 54 are now disposed as a first "composite" line in the second line pixel register (B) 59, and the pixel image signals corresponding to original pixel lines "3" and "4" in the vertical shift registers 54 are now disposed as a second "composite" line in the first line pixel register (A) 60.

These pixel image signals, now representing "composite" lines of the line pairs ("1"+"2"), and ("3"+"4") in the respective line pixel registers 59 (B) and 60 (A), are now clocked out of these line pixel registers 59 and 60 pixel-by-pixel and at the same time, and applied via the respective leads 47 and 46 to the respective analog signal processors ASP 17 and ASP 16.

In forming the respective "composite" lines in each one of the two line pixel registers (B) 59 and (A) 60 by supplying to the CCD image sensor 12 the precisely controlled and synchronized respective vertical and horizontal control signals from the timing logic system 14, in the television resolution mode of operation a total number of 256 "composite" lines (1024÷4) are outputted from each one of the two line pixel registers for one full image frame of the CCD image sensor 12.

As indicated previously, the multiplexer switch 18 (controlled by the display field control signal DF) provides for utilizing the video output signals of only one of the analog signal processors ASP 17 and ASP 16 (for example, the ASP 17) during the outputting of one full image frame or, stated differently, the video output signals of the other one of the two ASPs are not utilized for the duration of that one image frame. Thus, effectively the 256 "composite" lines of pixel image signals (now video signals) from the one line pixel register and its associated ASP are "connected" by the switch 18 to the input of the television-standard viewfinder display 20 to thereby form a first display field (for example, an "odd" display field).

When outputting the "composite" pixel image signals of the next consecutive image frame (in accordance with the temporal requirements of a television standard), the display field control signal DF now controls the multiplexer switch 18 such that the video output signals of only the other one of the two analog signal processors ASP 17 and ASP 16 (for example, the ASP 16) are utilized by being "connected" to the input of the television-standard viewfinder display 20 to thereby form an "interlaced" second display field (for example, an "even" display field).

Effectively, a full display frame (two display fields) is therefore formed from 256 "composite" lines (formed from alternate pairs of consecutive lines) of a first image frame, followed by "interlaced" 256 composite lines of a second image frame, for a total of 512 "composite" lines of the display frame. To provide an effective 525 lines per display frame in accordance with the NTSC standard, the timing logic system 14 generates certain selected "blanked-out" intervals of the vertical control signals V1 and V2, as will be described in more detail hereinafter.

It is important to note that the vertical and horizontal control signals applied to the CCD image sensor 12 (having two line pixel registers) by the timing logic system 14 are precisely referenced with respect to standard sync and control signals required by the viewfinder display 20. Thus video signals from that CCD image sensor in conjunction with ASP 16 and ASP 17 in a television resolution mode of operation of the imaging system 10 are directly viewable on the viewfinder display 20. In the high resolution mode of operation the video signals are outputted as single lines of pixel image signals from each one of the two line pixel registers of the CCD image sensor 12 via respective ASP 16 and ASP 17, and are directly provided to the respective one of the two inputs of the high resolution picture unit 24. This desirable result is obtained in a very effective way by the simple and inexpensive timing logic system and method provided by the present invention.

Figure 2:
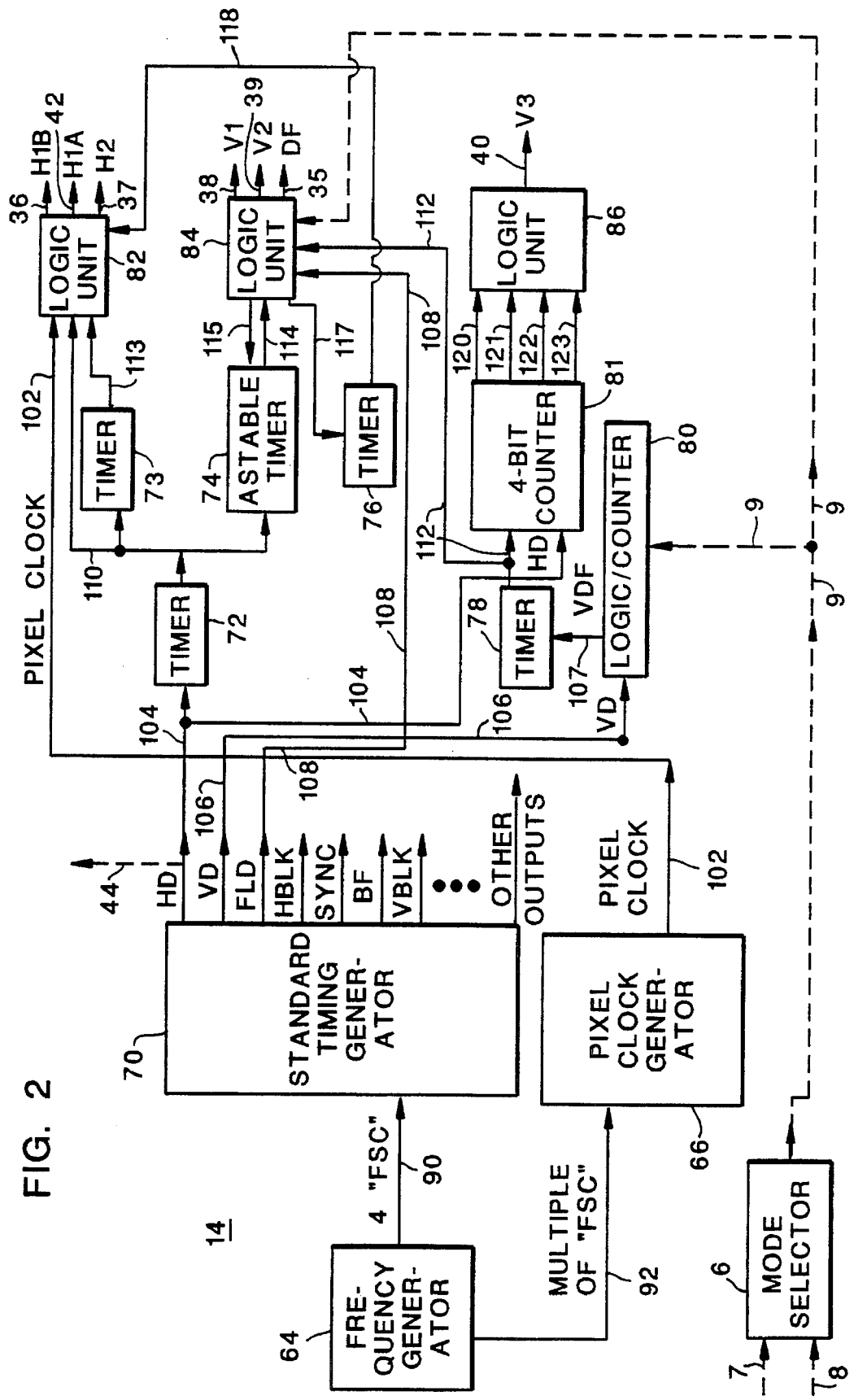
FIG. 2 is an illustrative schematic diagram of the timing logic system of FIG. 1 in accordance with the present invention.

Referring now to FIG. 2, there is shown an illustrative schematic diagram of the timing logic system 14 of FIG. 1 in accordance with the present invention. The timing logic system 14 comprises a frequency generator 64, a pixel clock generator 66, a generic television-standard timing generator 70, a timer 72, a timer 73, an astable timer 74, a timer 76, a timer 78, a logic/counter 80, a 4-bit counter 81, a logic unit 82, a logic unit 84 and a logic unit 86. By way of example, the sync and control signals generated by the standard timing generator 70 described hereinafter are in accordance with the NTSC standard.

The mode selector 6 selectably provides via a mode selector output lead 9 either "high resolution mode" control signals (inputted via an input lead 7) or "television resolution mode" control signals (inputted via an input lead 8) to the logic/counter 80 and to the logic unit 84, whereby the timing logic system 14 selectably generates the control signals required to control the high resolution CCD image sensor 12 of FIG. 1 in the high resolution mode and, alternatively, in the television resolution mode of operation. The leads 7, 8, and 9 are depicted as dashed lines, each one of which may be a multi-channel cable.

The timing logic system 14 outputs to the high resolution CCD image sensor 12 of FIG. 1 horizontal control signals H1A, H1B, and H2, via the leads 42, 36, and 37, respectively, the vertical control signals V1, V2, and V3 via the leads 38, 39 and 40, respectively, and a display field control signal DF via the lead 35. Required ones of the sync and control signals generated by the standard timing generator 70 may be outputted from the timing logic system 14 to the viewfinder display 20 of FIG. 1 by the multi-channel cable 44, (shown as a dashed line).

The frequency generator 64 operates at a pre-determined multiple of a standard frequency sub-carrier "fsc" (e.g., 12 "fsc"). In accordance with the NTSC standard, an output signal of 4 "fsc" from the generator 64 is connected via a lead 90 to an input of the standard timing generator 70. The standard timing generator 70 is thus synchronized with a four times multiple of the "fsc" (i.e., 14.3182 MHz).

A signal having a frequency of a selectable multiple of "fsc" is applied via a lead 92 from the frequency generator 64 to the pixel clock generator 66. In the above-identified patent application, entitled "Improved Logic System And Method For Controlling Any One of Different Charge Coupled Device Image Sensors to Provide Video Image Signals In Accordance With A Television Standard", Serial No. 08/005,323, there is described in detail how the signal frequency applied via the lead 92 to the pixel clock generator 66 is selected to correspond to the number of pixels (cells 50) in a horizontal line of the CCD image sensor 12. This patent application is incorporated by reference herein. By way of example here, the frequency of the signal on the lead 92 is selected to be 6 times "fsc" when the CCD image sensor 12 has 1032 cells 50 per horizontal line.

The pixel clock generator 66 generates a pixel clock, described in detail hereinafter, which is outputted onto a lead 102. During each cycle of the pixel clock the pixel clock generator 66 generates a train of pixel pulses, which, as was explained previously, correspond in number to the number of cells 50 in a horizontal line thereof in the CCD image sensor 12. The pulses of the pixel clock applied to the lead 102 are, as will be explained hereinafter, precisely referenced to each other and to the beginning and ending of each horizontal line of pixel image signals from the line pixel registers 59 and 60 of FIG. 1 in accordance with the television (NTSC) standard.

The standard timing generator 70 (which may be purchased off-the-shelf at low cost) generates a number of sync and control signals and applies them to respective output leads. Principal ones of these signals are identified here as: "horizontal drive" (HD), "vertical drive" (VD), "odd" and "even" field indicator" (FLD), "horizontal blank" (HBLK), "synchronizing" (SYNC), "burst flag" (BF), and ""vertical blank"" (VBLK). Other signals not specifically identified herein may also be generated by the generator 70. Certain ones of the identified signals HD, VD, FLD, etc. and their time relationships to other signals generated by the timing logic system 14 are described in greater detail hereinafter.

The HD signal from the standard timing generator 70 is applied via a common lead 104 to an input of the timer 72 and to one input of the 4-bit counter 81. The VD signal from the standard timing generator 70 is applied via a lead 106 to an input of the logic/counter 80. An output signal (hereinafter identified as "VDF") from the logic/counter 80 is applied via a lead 107 to an input of the timer 78. The FLD signal from the standard timing generator 70 is applied via a lead 108 to an input of the logic unit 84. The pixel clock from the pixel clock generator 66 is applied via the lead 102 to one input of the logic unit 82. An output of the timer 72 is applied via a common lead 110 to another input of the logic unit 82, to an input of the timer 73, and to an input of the astable timer 74.

An output of the timer 78 is applied via a common lead 112 to one input of the 4-bit counter 81, and to one input of the logic unit 84. An output of the timer 73 is applied via a lead 113 to another input of the logic unit 82. An output of the astable timer 74 is applied via a lead 114 to another input of the logic unit 84; and a control signal from the logic unit 84 is applied via a lead 115 to another input of the astable timer 74. Another control signal from the logic unit 84 is applied via a lead 117 to an input of the timer 76. An output of the timer 76 is applied via a lead 118 to another input of the logic unit 82.

Four outputs of the 4-bit counter 81 are applied by respective ones of leads 120, 121, 122 and 123 to separate inputs of the logic unit 86. The operation of the portion of the timing logic system 14 comprising the timers 72, 73, 76 and 78, the astable timer 74, the logic/counter 80, the 4-bit counter 81, the logic units 84, and 86, will be described in greater detail hereinafter. These various timers, counters, and logic units are easily assembled by a person skilled in the art from well known components which may be purchased off-the-shelf at low cost.

Referring now to FIG. 3A, there is shown schematically for the high resolution mode of operation a sequence of the first four pixel image lines "1" through "4" in the vertical shift registers 54 (only one vertical register 54 is depicted here) of the CCD image sensor 12 of FIG. 1. In the high resolution mode, the timing logic system 14 provides to the CCD image sensor 12 the control signals V1 and V2 to control line-by-line vertical shifting of the pixel image lines "1" through "4" along the vertical registers 54 and into the first line pixel register (A) 60. The timing logic system 14 also provides a control signal H1A to the first line pixel register (A) 60, the control signal H1A "enabling" the shifting of, for example, the first pixel image line "1" from the first line pixel register (A) 60 into the second line pixel register (B) 59, and to block the shifting of a subsequent line into that line pixel register (B) 59 in the high resolution mode. A second pixel image line, for example, line "2" is shifted into the first line pixel register (A) 60, and pixel image lines "1" and "2" are now clocked out "horizontally" and at the same time from the line pixel registers (B) 59 and (A) 60, respectively, by the "horizontal" control signals H1A and H2, and H1B and H2 provided by the timing logic system 14 to respective ones of the line pixel registers. The timing logic system 14 supplies the control signals V1, V2, H1B, H2, and H1A at respective frequencies and temporal relationships such that all pixel image lines "1" (52) through the last line "1024" (53) (see FIG. 1) comprising one image frame of the CCD image sensor 12, are outputted in 1/30 of a second, or, equivalently, the image frames are outputted at a rate of 30 frames per second. These pixel image signals, representing the lines "1" (52) and "2", are outputted to the inputs of the respective analog signal processors ASP 17 and ASP 16, respectively, via respective leads 47 and 46, and from the outputs of the ASPs to the inputs of the high resolution picture unit 24.

The vertical shifting, horizontal clocking, and outputting is next repeated for the image pixel lines "3" and "4", and is repeated for each one of two consecutive pixel image lines until all of the image pixel lines comprising one image frame of the high resolution CCD image sensor 12 have been outputted.

Thus, in the high resolution mode, one image frame of the high resolution picture unit 24 corresponds to one image frame of the high resolution CCD image sensor 12, and an image sensor frame is outputted at the rate of sixty flames per second.

Referring now to FIG. 3B, there is shown schematically for the television resolution mode of operation a sequence of the first four pixel image lines "1a" through "4a" of a temporally first image frame "a," and a sequence of the first four pixel image lines "1b" through "4b" of a second image frame "b" of the high resolution CCD image sensor 12, the lines "1a" through "4a" being in the vertical shift registers 54 during the first image frame "a" (only one vertical register 54 is depicted). In the television resolution mode, the timing logic system 14 provides to the CCD image sensor 12 the vertical control signals V1 and V2, to control line-by-line vertical shifting of the pixel image lines "1a" through "4a" along the vertical registers 54 and into the first line pixel register (A) 60. The timing logic system 14 also provides horizontal control signals H1A and H2 to the first line pixel register (A) 60, and it provides horizontal control signals H2 and H1B to the second line pixel register (B) 59.

However, in contrast to the high resolution mode of operation, in the television resolution mode of operation of the high resolution CCD image sensor 12, these control signals are provided by the timing logic system 14 to the CCD image sensor 12 at respective frequencies and temporal relationships such that consecutive pixel image lines (for example, lines "1a" and "2a" of the first image frame "a") are first shifted into first line pixel register (A) 60 and effectively "combined" in that first register as indicated in FIG. 3B in the form "1a+2a." Next, the control signal H1A, supplied by the timing logic system 14 to the first line pixel register (A) 60, provides a line pixel register shift pulse as an "enabling" condition for shifting the "combined" line "1a+2a" into the second line pixel register (B) 59. Then a pixel image line "3a," followed by a pixel image line "4a," is shifted into the first line pixel register (A) 60, thereby forming a "combined" line "3a+4a" therein. These two "combined" lines (corresponding to the first four pixel image lines "1a" through "4a" of a first image frame "a") are now clocked out "horizontally" and at the same time from the line pixel registers (B) 59 and (A) 60, respectively, by the "horizontal" control signals H1A and H2, and H1B and H2 provided by the timing logic system 14, and they are outputted via the respective leads 47 and 46 to the respective ASP 17 and ASP 16, and from there to the respective input terminals 29 and 27 of the multiplexer switch 18. This sequence is repeated for all pixel image lines of the first image frame.

In the television resolution mode, the timing logic system 14 (logic unit 84 of FIG. 2) provides via a lead 35 a display field control signal DF (derived from a field indicator signal "FLD" outputted by the standard timing generator 70) to the control terminal 25 of the multiplexer switch 18, such that multiplexer switch 18 connects only one of its input terminals (for example, only input terminal 29, connected to an output of the ASP 17) to its output terminal 26, and hence, via the lead 28 to the viewfinder display 20, throughout the outputting of all of the "combined" pixel image lines comprising the first image sensor frame "a." Stated differently, the multiplexer switch 18 is controlled to direct the video signal output from only one of the two ASPs (for example, ASP 17) to the display 20 during the outputting of all "combined" pixel image lines (for example, from "combined" line "1a+2a" through a "combined" line "1023a+1024a" corresponding to the first image frame "a" of the high resolution CCD image sensor 12, having 1024 pixel image lines.

Thus, the timing logic system 14 provides control signals to the CCD image sensor 12 of the type having two line pixel register, and to a switch means 18, such that every other one of the "combined" pixel image signal lines corresponding to a first image frame "a" is inputted as a video signal to the display 20, thereby effectively forming a first display field (which can be thought of as an "odd" field). The timing logic system 14 supplies the control signals to the image sensor 12, to the multiplexer switch or switch means 18, and sync and control signals via the leads 44 to the display 20, at frequencies and temporal relationships such that the first display field is displayed in 1/60 of a second, or, equivalently at the rate of sixty first fields (for example, "odd" fields) per second, in accordance with the NTSC standard.

A temporally second frame "b" of the CCD image sensor 12, having pixel image lines "1b" through "4b" indicated in FIG. 3B, is similarly processed by outputting "combined" lines ("1b+2b") and (3b+4b") at the same time from the respective line pixel registers B (59) and A (60) via the respective leads 47 and 46 to respective analog signal processors ASP 17 and ASP 16, followed by outputting of all of the remaining lines of the second image frame as "combined" lines. During the outputting of these "combined" lines corresponding to the second image frame "b," the "fld" control signal provided by the timing logic system 14 and applied to the control input terminal 25 of the multiplexer switch 18 controls the switch 18 such that its output terminal 26 connects to the other input terminal (for example, the input terminal 27, connected to an output of the ASP 16) of the switch 18 only, thereby effectively forming a second display field (which can be thought of as an "even" field) from the second image frame "b," and hence, forming an "interlaced" display among the two temporally consecutive display fields (corresponding to the two temporally consecutive image frames "a" and "b").

The second display field is also displayed in 1/60 of a second, or, equivalently at the rate of sixty fields per second, in accordance with the NTSC standard. Thus, a display frame comprising one "odd" display field "interlaced" with one "even" display field, is provided on a viewfinder display 20 (or on a television display) at the rate of thirty frames per second, in accordance with the NTSC standard.

The process of outputting lines of pixel image signals and of generating successive "odd" and "even" display field on the display 20 continues in the television resolution mode of operation so long as the high resolution CCD image sensor 12 is operative to provide first and second image frames.

Figure 4:
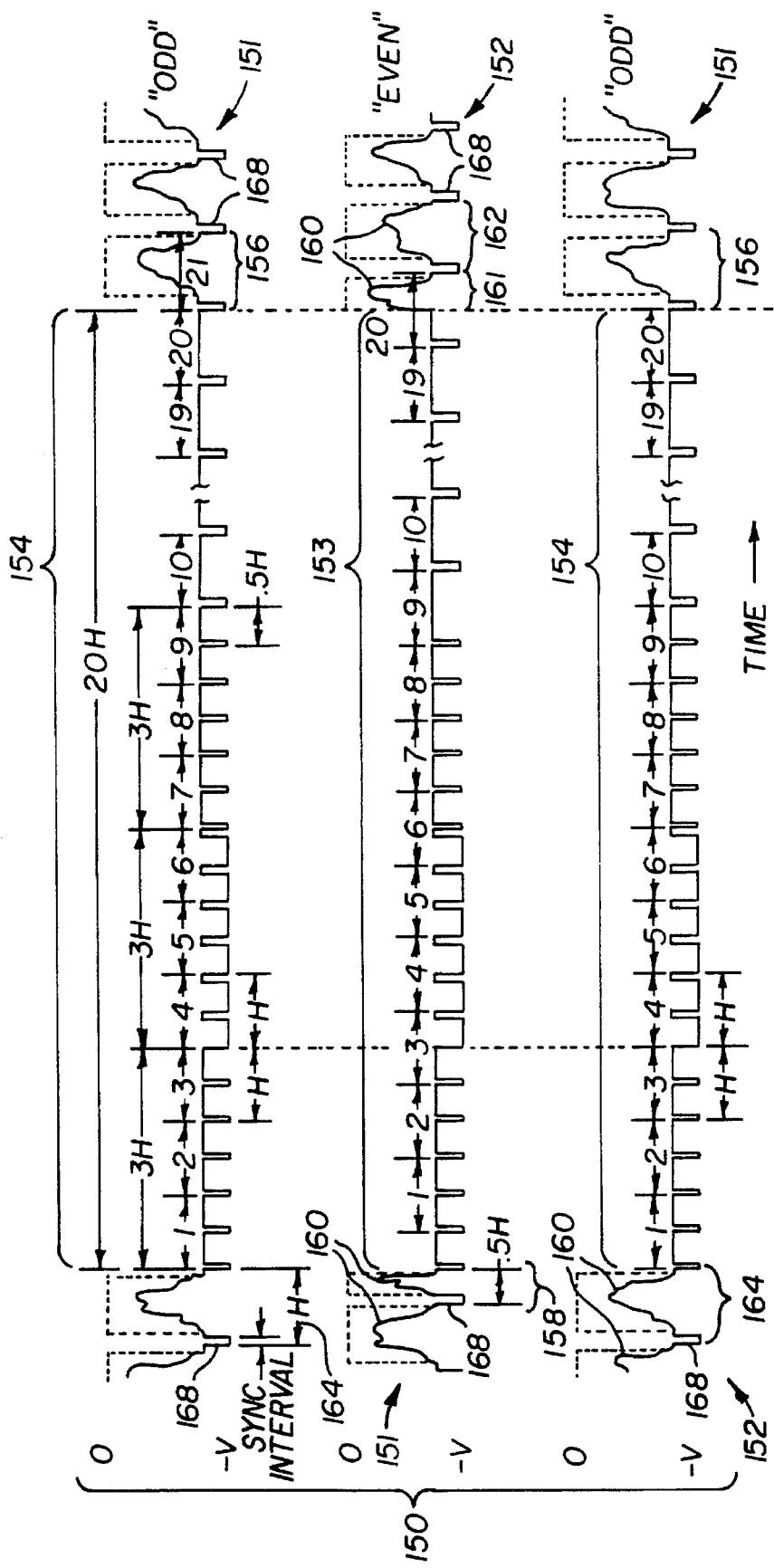
FIG. 4 is a schematic diagram of video image signals provided in accordance with the NTSC standard.

Referring now to FIG. 4, there are shown, by way of background explanation, television signals schematically indicated at 150 and provided in accordance with the NTSC standard. A much more complete discussion of television signals is to be found in the above-identified book by Bernard Grob. Time is indicated here along a horizontal axis and relative signal amplitude in volts along a vertical axis. The signal 150 is displayed sequentially line-by-line as an "odd" field indicated at 151, an "even" field indicated at 152, and "odd" field at 151, and so on. It is noted that only the beginning and ending portions of the "odd" and "even" fields are shown. The end of an "odd" field 151 and a next "even" field 152 are separated by a "vertical blank" interval indicated at 153, and the end of an "even" field 152 and a next "odd" field 151 are separated by a "vertical blank" interval 154. Various synchronizing pulses shown during the "vertical blank" intervals 153 and 154 are well known in the art and are not further described herein.

During each "vertical blank" interval 153 or 154, twenty horizontal lines "H" (20H) of the video portion of the signal 150 are blanked out. This provides time for vertical retrace from the end of one field to the beginning of the next, and so on. There are "262½" horizontal lines H in each of the fields 151 and 152 for a total of "525" lines in a vertical frame of the television picture. The flames are repeated 30 times a second, with the two fields thereof repeated at 60 times per second.

Beginning with the twenty-first line H, as indicated at 156, of an "odd" field 151, two hundred forty two full lines of the television signal 150 are displayed, followed by one half of a line H indicated at 158 at the end of an "odd" field 151. The video portion of the signal 150 during a horizontal line is indicated at 160. At the end of an "odd" field there is another "vertical blank" interval 153 followed by one-half of the twentieth line H indicated at 161 of the next "even" field 152. This half-line 161 is followed by a full twenty-first line, as indicated at 162, of the "even" field, and so on. Each "even" field ends in a full line, as indicated at 164, and then another "vertical blank" interval 154 begins. The time duration of a full line H, such as indicated at 156, 162 and 164, is termed "one line time". Each line H is initiated by a horizontal line sync pulse 168 applied during a very short "sync interval". It is to be noted that the horizontal line sync pulses 168 for each "odd" field are offset by a half line-time with respect to the line sync pulses 168 for an "even" field. Thus an "odd" field 151 ends with a half-line as indicated at 158 and an "even" field 152 begins with a half-line as indicated at 161, and so on.

Figure 5:
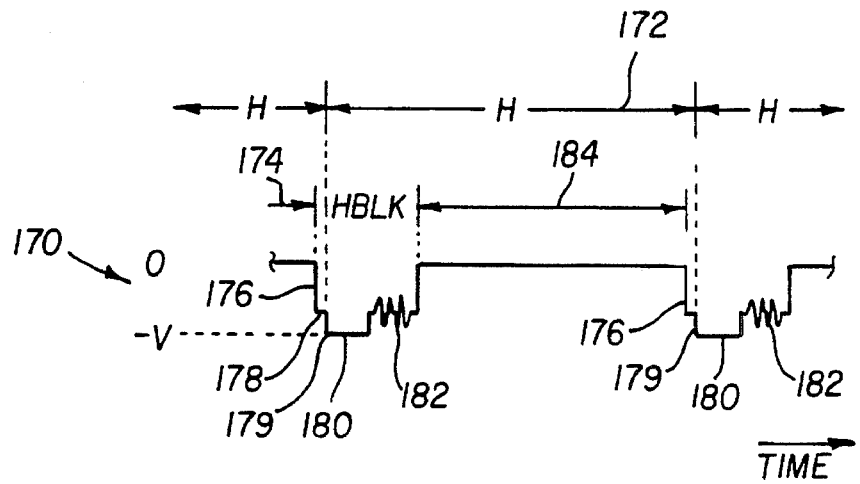
FIG. 5 is a waveform illustrating portions of a video signal for one standard horizontal line of a vertical frame.

Referring now to FIG. 5, there is shown greatly enlarged a waveform 170 of the end of one horizontal line H of a television signal (e.g., the signal 150 of FIG. 4), the following full horizontal line H of the signal from beginning to end, and the beginning portion of the next line H. Time is indicated to scale along a horizontal axis, and arbitrary signal voltage amplitude relative to zero along a vertical axis. For the sake of illustration, the video portion (e.g., the portion 160 of FIG. 4) of the waveform 170 is shown at zero amplitude. The time duration of one line (H) is indicated by the horizontal line 172 having arrow heads at the ends thereof. This line time 172 corresponds to the duration of the full lines 156, 162 and 164 of FIG. 4. In accordance with the NTSC standard, the line time 172 is 63.5 microseconds.

Shortly before the beginning of a line H there is an interval termed "horizontal blank" (HBLK) as indicated at 174. During the HBLK interval 174 there is a combined pulse 176. The combined pulse 176 has a level at 178 at which blanking of the video portion 160 of the television signal 150 (FIG. 4) occurs. The pulse 176 has a transition 179 to a sync pedestal 180, which corresponds to a horizontal sync pulse 168 (FIG. 4). At the end of the sync pedestal 180 the combined pulse 176 has a short oscillating portion 182, termed "burst flag" (BF), by which the color components of the video signal are decoded. The BF portion 182 comprises a number of oscillations of the standard frequency sub-carrier "fsc", as is well known in the art. A BF signal, like the BF portion 182, is generated by the timing generator 70. After the HBLK interval 174 there is an active portion 184 of the line H extending to the next HBLK interval 174, during which video image signals (not shown here) are displayed. The active line portion 184 has a time of 55.31 microseconds according to the NTSC standard. The video pixel image signals, (e.g., the video portion 160 of FIG. 4), are outputted, as was explained previously, from the line pixel registers (A) 60 and (B) 59 of FIG. 1, pixel-image-signal by pixel-image-signal corresponding to a horizontal line of cells 50 in the CCD image sensor 12. To obtain from the CCD image sensor 12 properly synchronized signals for each line (such as illustrated at 156, 158, 161, 162 and 164 in FIG. 4), it is essential that the pixel clock applied to the lead 102 (FIG. 2) have the proper number of pixel timing pulses (corresponding to the number of cells 50 in a horizontal line) and that each cycle of the pixel clock be precisely referenced to the line time 172, and to the active line interval 184 of FIG. 5. Also, during each HBLK interval 174, a horizontal line of pixel image signals must be shifted at a precisely synchronized instant from the vertical registers 54 of the CCD image sensor 12 into the line pixel registers 60 and 59 of FIG. 1.

Figure 6:
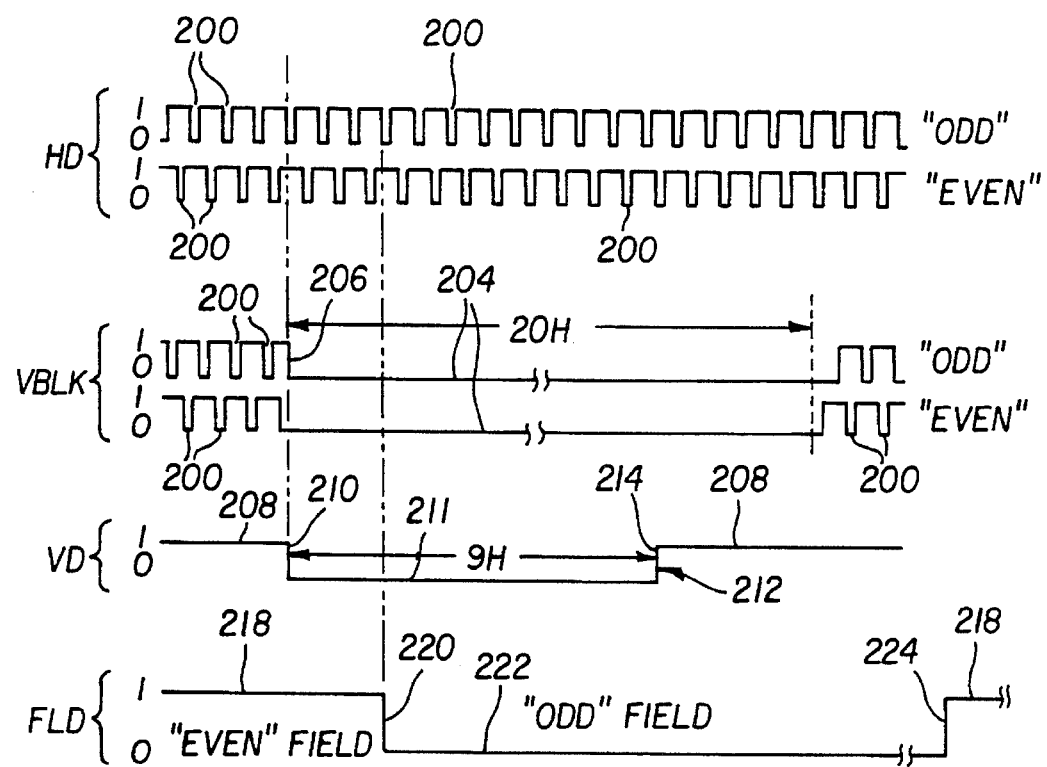
FIG. 6 shows in schematic form certain standard sync and control signals generated by a generic television-standard timing generator in accordance with the NTSC standard.

Referring now to FIG. 6, there are schematically shown certain of the standard output signals generated by the timing generator 70 of FIG. 2. Time is indicated along a horizontal axis and signal logic levels of binary "0" and "1" along a vertical axis. These signals are only briefly described herein since they are well known. A first one of the signals shown here is the horizontal drive (HD) signal which (see also FIG. 2) is applied to the lead 104. The HD signal comprises a series of sync pulses 200 which are evenly spaced by "one line time" (i.e., the line time 172 of FIG. 5) and which correspond to the horizontal sync pulses 168 (FIG. 4). It is noted that the HD sync pulses 200 shown here for an "even" field are offset by one-half of the line time 172 relative to the HD sync pulses 200 for an "odd" field. This conforms with the evenly spaced timing of the standard horizontal sync pulses 168 previously described (FIG. 4).

A "vertical blank" (VBLK) signal generated by the timing generator 70 (applied to an output lead identified as VBLK in FIG. 2) has a twenty-line (20H) blanking interval indicated at 204 for both the "odd" and "even" fields. The blanking intervals 204 begin at a transition indicated at 206 and are referenced to the HD sync pulses 200 for the "odd" and "even" fields, as shown. These blanking intervals 204 correspond to the standard vertical blank intervals 153 and 154 (FIG. 4).

A vertical drive (VD) signal (applied to the lead 106 in FIG. 2) has a first level (shown as logic "1") indicated at 208 which at a transition 210 goes to a second level (shown as logic "0") 211 to form a pulse 212. The transition 210 is matched in time with the transition 206 of the VBLK signal. The second level 211 of the VD signal pulse 212 has a duration of nine line-times (9H) after which the VD signal at a transition 214 returns to the first level 208.

An "odd" and "even" field indicator (FLD) signal (applied to the lead 108 in FIG. 2) has a first level (logic "1") 218 (indicating an "even" field) which at a first transition 220 goes to a second level (logic "0") 222 (indicating an "odd" field). At the end of an "odd" field the FLD signal goes from the second level 222 at a second transition 224 back to the first level 218. The first transition 220 of the FLD signal occurs three line-times after the transition 210 of the VD signal, as does the second transition 224.

Synchronizing (SYNC) signals generated by the standard timing generator 70 and applied to an output lead (identified as SYNC in FIG. 2) are not shown herein but correspond to the standard sync pulses 168 and other sync pulses (not numbered) within the "vertical blank" intervals 153 and 154 (FIG. 4). Similarly, other signals generated by the timing generator 70 are not illustrated herein but are well known in the art.

Figure 7A:
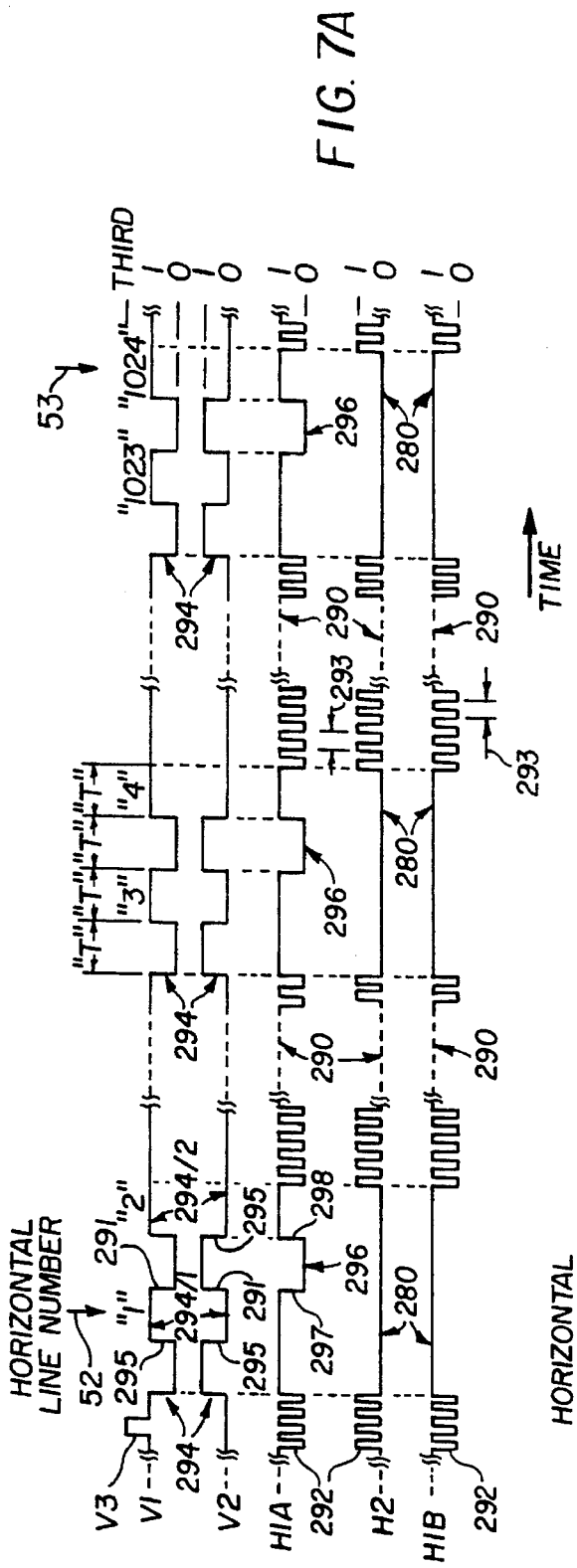
FIG. 7A is a schematic illustration of certain temporal relationships among various horizontal and vertical control signals provided in accordance with the present invention by the timing logic system for the high resolution mode of operation of the high resolution CCD image sensor of FIG. 1.

Referring now to FIG. 7A, there are shown in schematic form some important time relationships of various control signals generated within the timing logic system 14 of FIG. 2 in the high resolution mode of operation. Time is shown along a horizontal axis and signal logic levels of "0" and "1" are shown along a vertical axis.

Control signals V1 and V2 are complementary signals outputted by the logic unit 84 of the timing logic system 14 and supplied to the vertical shift registers 54 of the CCD image sensor 12 via the leads 38 and 39, respectively. Both control signals V 1 and V2 have pulses 294, shown here with an approximately 50% duty cycle as indicated by equal time intervals "T"), which shift one line of pixel image signals within the vertical shift registers 54 line by 35 line whenever a V1 pulse 294 has a "high" value, corresponding to a logic level "1 ," and the complementary V2 pulse 294 has a "low" value, corresponding to a logic level "0." Horizontal line numbers "1 ," "2," "3 ," "4," and "1023 ," "1024" are indicated, where the line number "1" corresponds to the first line 52 of FIG. 1, and the line number "1024" corresponds to the last line 53 of FIG. 1. Also indicated on the left side of the V1 control signal is a V3 control signal having a "third" logic level shown superimposed on the V1 control signal. This V3 signal is a frame shift pulse which shifts all of the pixel image signals of an entire image frame at the same time from the cells 50 into the vertical registers 54. The V3 signal will be described in greater detail hereinafter.

Depicted below the V 1 and V2 control signals in FIG. 7A are schematically the horizontal control signals H1A, H2, and H1B which are provided by the logic unit 82 of the timing logic system 14 and supplied to the line pixel registers (A) 60 and (B) 59 via the lead 42, the combined lead 37, and the lead 36, respectively. Both control signals H2 and H1B are complementary signals. Each of the horizontal control signals H1A, H2 and H1B has horizontal clock pulses 292 of the same frequency, and having a periodicity indicated at 293. Complementary control signals H2 and H1B have a "horizontal blank period" 280 during which the horizontal clock pulses 292 are absent (no "horizontal" pixel image signal readout from the line pixel registers (A) 60 and (B) 59).

The horizontal control signal H 1A has, in addition to the horizontal clock pulses 292, a line pixel register shift pulse 296 shown for clarity of presentation as having a first transition 297 synchronized with a transition 291 of a V1 pulse 294/1 (and a V2 pulse 294/1), and shown as having a second transition 298 synchronized with a transition 295 of a V1 pulse 294/2 (and a V2 pulse 294/2). The line pixel register shift pulses 296 are located within the respective horizontal blank periods 280.

In the high resolution mode of operation depicted in FIG. 7A, the vertical shifting of pixel image lines "1" and "2," "3" and "4," and "1023" and "1024" from the vertical shift registers 54 into the first line pixel register (A) 60 and of only the lines "1," "3," and "1023" from there into the second line pixel register (B) 59, as well as the horizontal readout of the pixel image signals from these line pixel registers will now be described briefly:

The first pixel image line "1" (52) is shifted from the vertical shift registers 54 into the first line pixel register (A) 60 by the first V 1 and V2 pulse 294/1. The line pixel register shift pulse 296 of the horizontal control signal H1A shifts this first pixel image line "1" into the second line pixel register (B) 59. During a second V 1 and V2 pulse period 294/2, the second pixel image line "2" (now in a "first line position" in the vertical shift registers 54) is shifted into the first line pixel register (A) 60. Following the second pulse period 294/2 (equivalent to one half of the duty cycle of the vertical control signals V1 and V2), the horizontal readout (via horizontal clock pulses 292) of the image pixel signals in each one of the two line pixel registers commences and proceeds at the same time, whereby the first line pixel register (A) 60 is "clocked" by the pulses 292 of the horizontal control signals H1A and H2, and the second line pixel register (B) 59 is "clocked" by the pulses 292 of the horizontal control signals H1B and H2.

After lines "1" and "2" have been clocked out or outputted, the vertical shifting and horizontal readout repeats for the lines "3" and "4," and finally for the lines "1023" and "1024."

In FIG. 7A, each of the control signals V1, V2, H1A, H2, and H1B are shown as interrupted between the cycles corresponding to horizontal line numbers "1" and "2," "3" and "4," and "1023" and "1024," respectively, as well as prior to and subsequent to these shifting and readout cycles. Such interruptions are used in the schematic presentation of FIG. 7A for the purpose of clarity of presentation. By way of example, if the high resolution CCD image sensor 12 has 1024 lines of image sensing pixels 50, and each line has 1024 active (i.e., light-sensing) pixels, the total time allocated to the vertical line shifting (V1, V2, and pulses 296 of H1A) and to the horizontal readout (pulses 292 of H1A, H2, and H1B) of all pixel image signals of all lines is 1/30 of a second (for one full image frame) if a frame rate of 30 image frames per second is desired to be outputted to the high resolution picture unit 24 of FIG. 1. Accordingly, the vertical shifting of two consecutive lines (for example, lines "1" and "2") and the simultaneous readout of the two lines must occur within a time interval of about 65 microseconds. Since each of the time intervals "T" of the pulses 294 (V1 and V2) and of the pulses 296 (H1A) has a typical value of about two microseconds (for a total time of the horizontal blank period 280 of about eight microseconds in the high resolution mode of operation shown in FIG. 7A), it is evident that approximately 57 microseconds (65 minus 8) are allocated to the horizontal readout of pixel image signals from the line pixel registers. Thus, the sketched interruptions were used to "shorten" the duration of the horizontal clocking (pulses 292) cycles so as to show several vertical shifting and horizontal readout cycles in one figure.

Figure 7B:
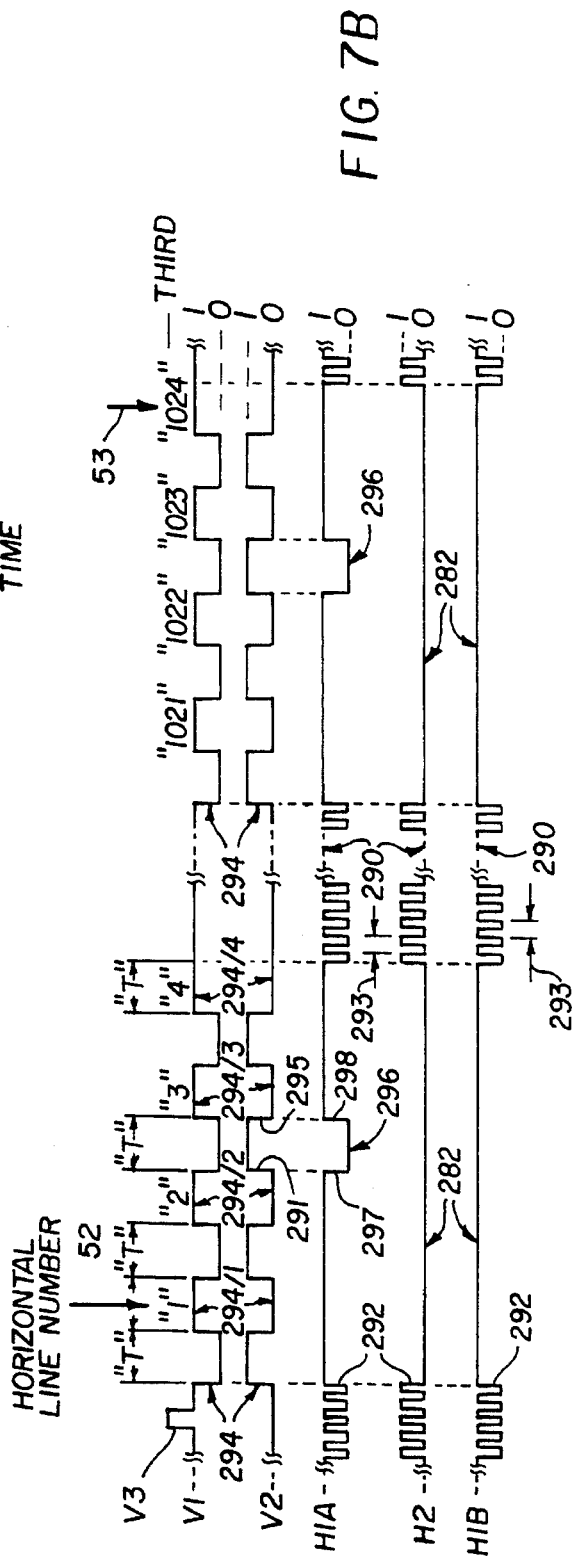
FIG. 7B is a schematic illustration of certain temporal relationships among various horizontal and vertical control signals provided in accordance with the present invention by the timing logic system for the television resolution mode of operation of the high resolution CCD image sensor of FIG. 1.

Referring now to FIG. 7B, there is schematically depicted the relationship between the vertical control signals V1 and V2 and the horizontal control signals H1A, H2, and H1B for the television resolution mode of operation.

In contrast to the high resolution mode of operation described above in conjunction with FIG. 7A, in the television resolution mode a "horizontal blank period" 282 is provided by the logic unit 82 of the timing logic system 14 such that four consecutive pixel image lines of a first image frame "a" (for example, shown as lines "1a," "2a," "3a," and "4a") can be vertically shifted from the vertical shift registers 54 into the first line pixel register (A) 60, of which lines "1" and "2" are further shifted into the second line pixel register (B) 59, all shifting taking place during the horizontal blank period.

Here, the first horizontal line "1a" (line 52 in FIG. 1 ) is shifted from the vertical shift registers 54 into the first line pixel register (A) 60 by a first V1 pulse 294/1 (and a complementary first V2 pulse 294/1), followed by shifting the second horizontal line "2a" into the same first line pixel register (A) 60, thereby forming a "combined" line (or a "composite" line) "1a+2a" of pixel image signals in that register (A) 60. A line pixel register shift pulse 296 is shown in the H1A control signal as having a first transition 297 synchronized with a transition 291 of the V1 pulse 294/2 (and the V2 pulse 294/2), and as having a second transition 298 synchronized with a transition 295 of a V 1 pulse 294/3 (and a V2 pulse 294/3). A line pixel register shift pulse 296 shifts the "combined" or "composite" line (the sum of lines "1a" and "2a") from the first line pixel register (A) 60 into the second line pixel register (B) 59. During the V1 and V2 pulses 294/3, the next horizontal line number "3a" is shifted into the first line pixel register (A) 60, followed by the line number "4a" via a V1 and V2 pulse interval 294/4, thereby forming in the line pixel register (A) 60 a "combined" or "composite" line "3a+4a."

At this time, the horizontal blank period 282 of the control signals H2 and H1B has ended, and the horizontal clock pulses 292 are commencing (on the control signals H1A, H2, and H1B) to provide "horizontal" readout of the "combined" or "composite" lines from the two line pixel registers at the same time.

Thus, in the television resolution mode of operation, a total of four consecutive pixel image signal lines are shifted from the vertical shift registers 54 in two sequences of two lines each, so that one "combined" line is outputted from each one of the two line pixel registers at the same time. The vertical shifting and the horizontal "clocking" are controlled by the timing logic system 14 such that a first image frame is outputted in 1/60 of a second to form a first display field of display 20 from the video signals corresponding to one of the two line pixel registers (via a field control signal DF provided by the logic unit 84 and applied to a control signal terminal 25 of a multiplexer switch 18 via a lead 35), and a temporally second image frame is outputted in 1/60 of a second to form an "interlaced" second display field of display 20 from the video signals corresponding to the other one of the two line pixel registers.

Features not detailed with respect to FIG. 7B are features identical to those described in conjunction with FIG. 7A.

Figure 8:
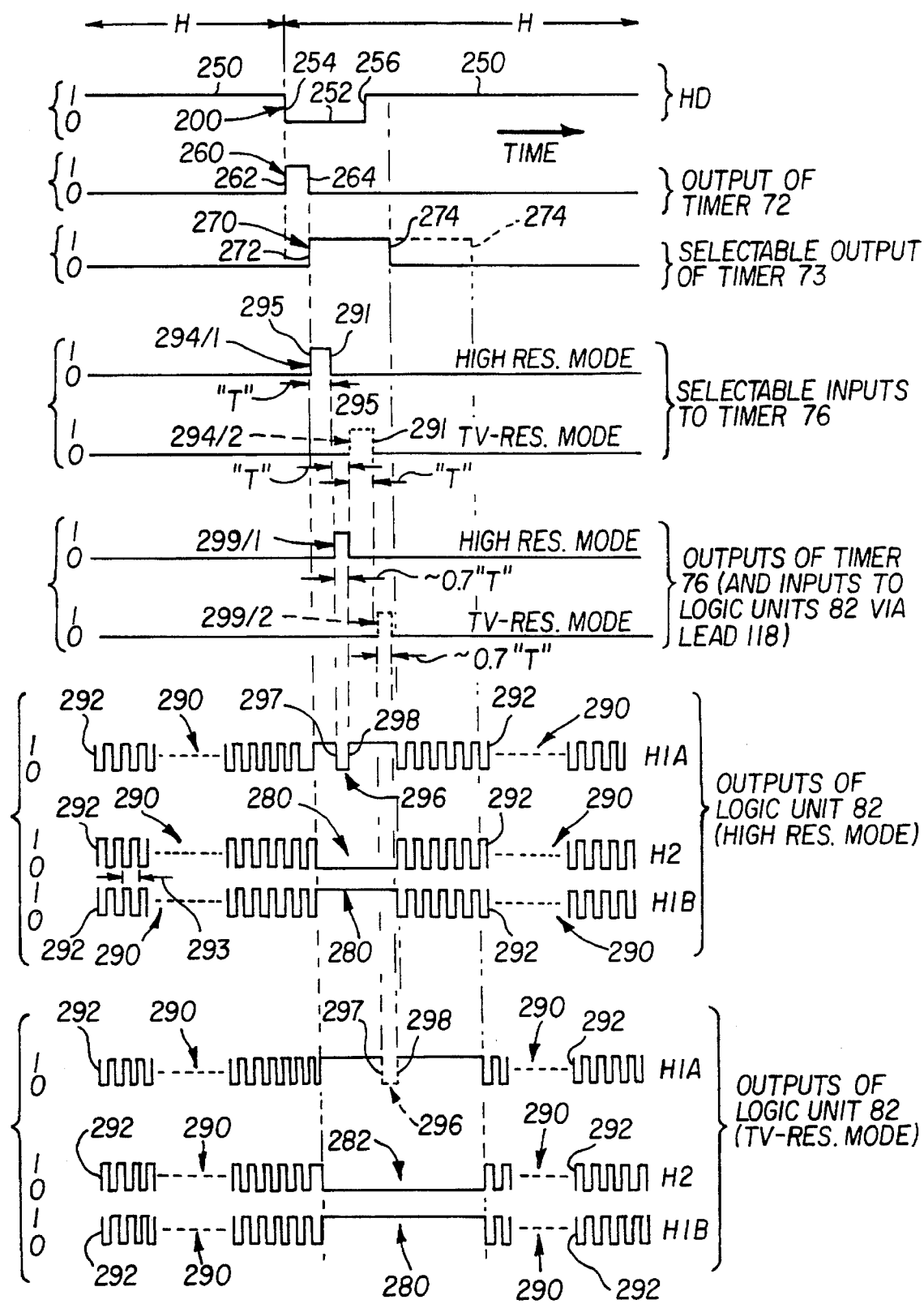
FIG. 8 depicts schematically the outputs of some of the timers and logic units of the timing logic system used to generate three horizontal control signals in accordance with the invention for the high resolution mode and alternatively for the television mode of operation of the high resolution CCD image sensor of FIG. 1.

Referring now to FIG. 8, there are shown schematically the outputs of some of the timers and of the logic unit 82 and the input to one timer of the timing logic system 14 pertinent to the generation of the horizontal control signals H1A, H2, and H1B. Time is shown along the horizontal axes, and signal logic levels of "0" ("low") and "1" ("high") are shown along the vertical axes.

A single synchronization (sync) pulse 200 from the "odd" field "first field" sequence of pulses of the HD signal (see also FIG. 6) is shown going from a first level 250 to a second level 252 at a transition 254 ad then at a later transition 256 back to the level 250. The transition 254 marks the beginning of the next horizontal line H and the end of the previous line, as indicated. The exact relationship of the sync pulses 200 of the HD signal to the standard sync pulses 168 of FIG. 4, the HBLK intervals 174 (FIG. 5), and the VBLK intervals 204 of FIG. 6 has previously been described.

Shown positioned below the sync pulse 200 is a precisely timed pulse 260 which is generated by the timer 72 of FIG. 2 at the beginning of each HD signal pulse 200. The timed pulse 260 begins at a transition 262 (coincident with the transition 254) and ends shortly afterward at a transition 264 even though the sync pulse 200 is still present (i.e., at a "0"). The pulse 260 is applied to the common lead 110 of FIG. 2.

The trailing transition 264 of the timed pulse 260 triggers the timer 73 of FIG. 2 which produces selectably a timed pulse 270. The pulse 270 begins at a transition 272 and ends at a transition 274. It is noted that the transition 272 occurs at the same time as does the transition 264, and that the transition 274 occurs selectably after the transition 256 of the HD sync pulse 200. Thus the timed pulse 270 (which is applied via the lead 113 to an input of the logic unit 82 in FIG. 2) begins only after a precisely set interval (determined by the pulse 260) after a HD sync pulse 200 occurs. The timed pulse 270 continues for a selectable precisely set interval (determined by the timer 73) until after the HD sync pulse 200 has ended.

The pulses 260 (from timer 72), the pulses 270 (from timer 73), and the pixel clock on the lead 102 (FIG. 2) are logically combined, in a way well known in the art, in the logic unit 82 to produce the output horizontal control signals H1A, and H2 and its complement H1B. As schematically illustrated in FIG. 8, the horizontal control signal H1B (with logic levels "0" and "1 "), and the complementary horizontal control signal H2, (with logic levels "0" and "1") have a "blanked-out" portion 280 and, alternatively a "blanked-out" portion 282 during which the pixel clock indicated at 290 is interrupted.

In FIG. 8, shown above the H2 and H 1B outputs of the logic unit 82 for the high resolution mode and the television resolution mode, respectively, is the horizontal control signal H 1A as a further output of the logic unit 82. The horizontal control signal H 1 A, having the line pixel register shift pulse 296, as well as the horizontal clock pulses 290 (FIGS. 7A and 7B), is formed in the logic unit 82 by a logical combination of the pixel clock on the lead 102 (FIG. 2), the pulse 260 (from the timer 72, the selectable pulse 270 (from the timer 73), and a pulse 299/1 (from the timer 76 via a lead 118), the pulse 299 being selectably generated by the astable timer 74 under control (via the lead 115) of the logic unit 84 (which outputs the vertical control signals V1 and V2 and a display field selector signal DF), and the pulse 299/1 being outputted by the logic unit 84 and applied via a lead 117 to the input of the timer 76.

The generation of the line pixel register shift pulse 296 of the horizontal control signal H1A from the selectably generated pulse 299/1 is detailed in FIG. 8 below the traces indicating the selectable inputs to the timer 76 (pulses 294/1 and 294/2), for both the high resolution mode and for the television resolution mode of operation (see FIG. 7A and 7B, respectively).

In the high resolution mode of operation (FIG. 7A), the logic unit 84 (which controls the astable timer 74) generates the vertical control signals V1 and V2 as pulses 294 (for example, the V1 pulses 294/1 through 294/3 of FIGS. 7A and 7B). An output of the logic unit 84 provides only the first one (pulse 294/1) of the V1 pulses 294 via the lead 117 to the input of the timer 76. The leading transition 295 of the pulse 294/1 actuates the timer 76 to time an interval __t which is at least as long in duration as a time interval "T" of the V1 pulse 294/1, but less than a time interval equivalent to 1.2×"T." The timer 76 can be viewed as a "delay line" relative to the leading transition 295 of the pulse 294/1. The output of the timer 76 is a pulse 299 which is supplied via a lead 118 to an input of the logic unit 84. The pulse 299 has a duration of at most 0.7×"T," and it generates in the logic unit 82 a line pixel register shift pulse 296 of that duration on the H1A horizontal control signal. Thus, the line pixel register shift pulse 296 of the horizontal control signal H 1A occurs in the high resolution mode of operation between the first V1 pulse 294/1 and the second V1 pulse 294/2 (and the respectively complementary V2 pulses) as shown in FIG. 7A.

In the television resolution mode of operation, the logic unit 84 provides via the lead 117 to the input of the timer 76 only the second one (294/2) of the three consecutive V1 pulses 294/1 through 294/3, the leading transition 295 of which actuates the timer 76; this second pulse providing a pulse 299/2 (FIG. 7B). Both the pulse 294/2 and the pulse 299/2 are shown in dotted outline as being temporally shifted to the right relative to the solid outline of the first pulse 294/1 and the pulse 299/1, respectively, shown for the high resolution mode. The timer 76 functions as described above and accordingly produces the pulse 299/2 on the lead 118 connecting the output of the timer 76 to an input of the logic unit 82. Thus, the line pixel register shift pulse 296 of the horizontal control signal H1A occurs in the television resolution mode of operation between the second V1 pulse 294/2 and the third V1 pulse 294/3 (and the respectively complementary V2 pulses) as shown in FIG. 7B.

It is to be understood, of course, that the blanked-out portions 280 and 282, respectively, and the pixel clock 290 in the control signal H2 are the complements of the blanked-out portions 280 and 282 and the pixel clock 290 in the control signal H1B. The pixel clock 290 of the control signals H1A, H1B, and H2 comprises evenly spaced pixel timing pulses 292. The pixel timing pulses 292 are in the form of a square wave having a 50% duty cycle and a period indicated at 293. For a drive signal of 6 "fsc" applied to the pixel clock generator 62, the period 293 is "one' divided by 6 "fsc". Each timing pulse 292 in the horizontal control signals H1A, H1B, and H2 drives at the same time each one of the line pixel registers 60 and 59 of FIG. 1 to output a single pixel image signal. There are provided here as many timing pulses 292 in a single cycle of the horizontal control signals H1A, H1B, and H2 as are required to output at the same time from the line pixel registers 60 and 59 all of the active pixel image signals as well as the beginning and ending "D ref" and "Z ref" signals from a horizontal line of cells 50 of the CCD image sensor 12. The exact position and duration of the "blanked-out" intervals 280 and 282 within the horizontal control signals H1B and H2 are referenced as shown to the HD sync pulses 200.

Figure 9:
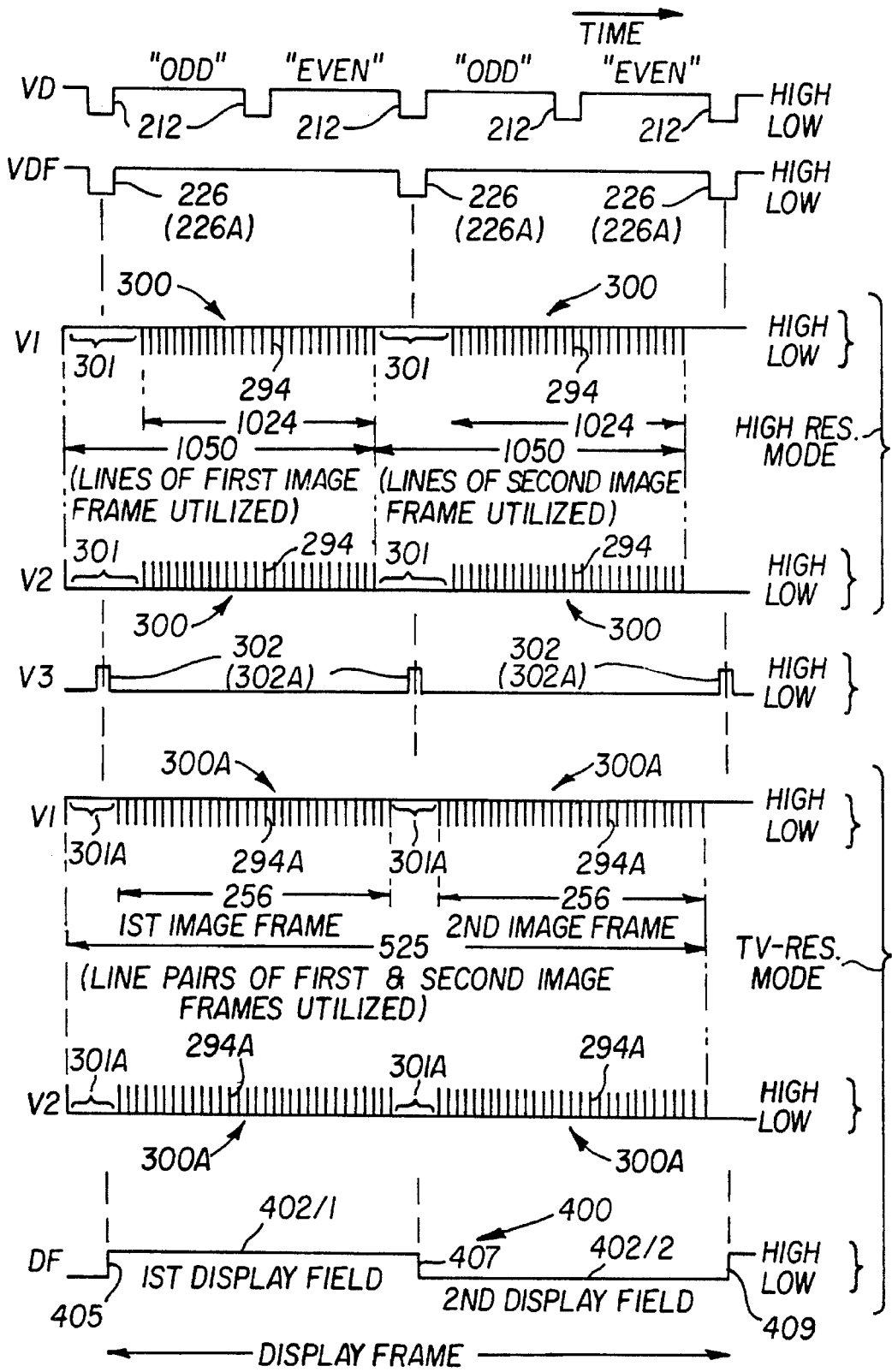
FIG. 9 is a schematic illustration of certain temporal relationships between a vertical drive signal provided by the generic television-standard timing generator of the timing logic system and three vertical control signals provided by the timing logic system for controlling the high resolution CCD image sensor of FIG. 1 in the high resolution mode of operation in accordance with the present invention and shown in an upper portion, and the temporal relationships between these signals and a display field control signal provided by timing logic system for controlling the CCD image sensor and a switch means in the television resolution mode of operation in accordance with the invention and shown in a lower portion.

Referring now to FIG. 9, there are shown schematically (not to scale) some of the temporal relationships between the vertical drive signal VD supplied by the generic television-standard timing generator 70 and a control signal VDF, and the vertical control signals V1, V2, and V3 generated by the timing logic system 14 of FIG. 2 to control the high resolution CCD image sensor 12 of FIG. 1 in the high resolution mode of operation and, alternatively in the television resolution mode of operation.

In an upper portion of FIG. 9, the vertical control signals are shown to depict the vertical shifting horizontal lines of pixel image signals comprising two consecutive image frames into (from the cells 50) and out of the vertical shift registers 54 of the high resolution CCD image sensor 12 (FIG. 1 ), and clocked "horizontally" out of the two line pixel registers at the same time as two separate lines of pixel image signals.

In a lower portion of FIG. 9, the vertical control signals are shown (at the same time scale) to depict the vertical shifting of horizontal lines of pixel image signals comprising two consecutive image frames into and out of the vertical shift registers 54 of the high resolution CCD image sensor 12, so as to provide video signals forming a first display field on a standard television display (such as on the viewfinder display 20) from the first one of the two image frames and to form an "interlaced" second display field from the temporally second on of the two image frames. A display field control signal DF is indicated for the television resolution mode of operation, the signal DF being supplied by the logic unit 84 (along with the signals V1 and V2) via the lead 35 to the control terminal 25 of the multiplexer switch 18, thereby controlling the switch 18 to direct the video signals of the first image frame as the first display field to the display 20, and to direct the video signals of the second image frame as the second display field to the display 20. Two "composite" lines are clocked "horizontally" out of the two line pixel registers at the same time, corresponding to a total of four lines (two line pairs) of pixel image signals, of which alternate "composite" lines of the first image frame are displayed in an "interlaced" fashion with alternate "composite" lines of the second image frame.

In FIG. 9, time is indicated along a horizontal axis, and the logic levels of the various signals are given on the vertical axes as "high" (a "1") and "low" (a "0").

Evenly spaced VD signal pulses 212 (five are shown) from the VD output of the generic television standard timing generator 70 are applied via the lead 106 to the input of the logic/counter 80 (FIG. 2). These evenly spaced VD pulses 212 would be used (in conjunction with other "television-standard" signals provided by the television-standard timing generator 70) to define successive "odd" and "even" fields of image pixel signal lines if a conventional "television-standard" CCD image sensor having 525 image pixel lines and one line pixel register were used to produce image frames. Since the present invention is directed at a timing logic system (incorporating a generic television-standard timing generator 70) for controlling a high resolution CCD image sensor of the type having two line pixel registers and having, for example, 1024 image pixel lines, the sequence of VD signal pulses 212 needs to be modified accordingly, as will be detailed hereinafter.

Shown positioned below the traces of the VD signal pulses 212 are VDF signal pulses 226 (high resolution mode) and, alternatively pulses 226A (television resolution mode). Three VDF signal pulses are shown. Vertical control signals V1 and V2 (which are complements of each other) are shown positioned below the VDF signal traces and corresponding to the high resolution mode, and to the television resolution mode, respectively. Indicated positioned below each of the V1 and V2 signal traces are the traces corresponding to the respective V3 signal pulses ("frame shift" pulses). And shown positioned below the V3 signal pulses (and corresponding only to the television resolution mode of operation) is the display field control signal DF which controls the multiplexer switch 18.

In the high resolution mode of operation, the vertical control signals V1 and V2 comprise a vertical clock 300, one image frame cycle of which has, for example, "1024" of the single vertical shift pulses 294 (only a nominal number of which are actually shown).

As will be explained in detail shortly, there is a blanked-out interval indicated at 301 at the beginning of each cycle (frame) of the vertical control signals V1 and V2.

The VDF signal (lead 107 of FIG. 2) comprises a sequence of pulses 226 which are referenced to the VD signal pulses 212 and are selectively (by the control signals from the mode selector 6 via the lead 9) generated by the logic/counter 80 in response to the VD signal pulses 212 applied to its input. The logic/counter 80 is set to output only one VDF pulse 226 for every other one of the VD pulses 212, as shown here.

The vertical control signal V3 comprises a sequence of pulses 302 which, as will be explained shortly, are generated by the logic unit 86, being referenced to the VDF signal pulses 226. There is a V3 pulse 302 on the occurrence of each VDF pulse 226. On the occurrence of each V3 signal pulse 302 (lead 40), all of the horizontal lines of pixel image signals are shifted from the cells 50 into the vertical registers 54 of the CCD image sensor 12. Thereafter the pixel image signals are shifted line-by-line along the vertical registers 54 toward and into the two line pixel registers, and clocked out horizontally therefrom, as was explained previously. The pulses 302 are hereinafter referred to as "frame shift" pulses.

By way of example, there are five VD signal pulses 212 illustrated in the upper portion of FIG. 9. Corresponding to a first one of these pulses 212 (shown at the farthest left side of the figure) there is a V3 signal pulse 302 (generated by the logic unit 86) which causes the shifting of all of the lines of pixel image signals from the cells 50 into the vertical registers 54 of the CCD image sensor 12. In the interval during which all of these lines (e.g., 1024 lines) are sequentially shifted line by line into the first line pixel register (A) 60 (and into the second line pixel register (B) 59, via a line pixel register shift pulse 296 of the H1A control signal, as shown in FIGS. 7A and 7B), there occurs one additional VD signal pulse 212 (corresponding to succeeding "even", "odd", and "even" fields of the previously mentioned standard TV picture frames) but no VDF pulses 226 and no V3 pulse 302. This non-occurrence of the V3 pulse 302 provides sufficient time for the sequential shifting by the single vertical shift pulses 294 and pulses 294A of all 1024 horizontal lines of pixel image signals. Then, there is another V3 pulse 302 at the beginning of a third (another "odd" field) interval, and the sequence repeats. That "third interval" V3 pulse, corresponding to the previously mentioned "odd" and "even" fields of standard television display frames, is selected by the logic/counter 80 to produce another VDF signal pulse and via the counter 81 and the logic unit 86 a corresponding V3 signal pulse (frame shift pulse), thereby initiating the shifting of the pixel image signals of the next consecutive image frame from the cells 50 into the vertical shift registers 54.

The blanked-out intervals 301 of the vertical control signals V1 and V2 will be described in more detail in conjunction with FIG. 10. The basic function of these blanked-out intervals 301 (and of the corresponding blanked-out intervals 301A in the television resolution mode of operation) is to provide a precisely timed "time cushion" prior to the onset of the pulses 294 (and 294A) of the vertical clock 300, so that all of the horizontal lines of pixel image signals of one image frame (for example, the "1024" lines of the high resolution image sensor 12) can be shifted vertically by the pulses 294 and clocked out horizontally by the pulses 292 in a "total image frame time" corresponding to the "odd" and "even" fields of two standard television display frames (2×525 lines, for a total of "1050" television lines).

Referring now to the television resolution mode of operation depicted in the lower portion of FIG. 9, the logic/counter 80 of FIG. 2 provides one VDF signal pulse 226A at its output for every other one of the VD pulses 212 at its input. Correspondingly (via the counter 81 and the logic unit 86), there are three V3 signal pulses 302A generated by the timing logic system 14. The vertical control signals V1 and V2 now each comprise two consecutive vertical clock cycles 300A, a first clock cycle corresponding to a first image frame and a second clock cycle corresponding to a temporally second (or "next") image frame. As has been described previously (FIG. 7B), in the television resolution mode of operation, the vertical clock 300A (pulses 294A) and the horizontal clocks 290 (pulses 292) are temporally precisely related in such a manner that the video signals corresponding to the first image frame (forming the first display field) can be displayed on the display 20 in 1/60 of a second, followed by the "interlaced" display in 1/60 of a second of the second display field which is derived from the video signals of the second image frame.

The blanked-out intervals 301A preceding each clock cycle 300A are precisely timed so that the total time allocated for vertical and horizontal clocking (and the outputting of video signals to the analog signal processors ASP 16 and ASP 17) of the two image frames (two "interlaced" display fields), is identical to the time (1/30 of a second) to form a single display frame of a television display (having "525" horizontal lines in accordance with the NTSC standard).

The display field control signals DF (controlling the multiplexer switch 18 of FIG. 1 via the lead 35) is indicated at 400, and is generated by the logic unit 84 from the "FLD" signal provided by the generic television-standard timing generator 70 via a lead 108 to an input of the logic unit 84. The DF signal 400 has a first transition 405 from a "low" level to a "high" level 402/1. That signal level 402/1, supplied via a lead 35 to the control input terminal 25 of the multiplexer switch 18, controls the switch 18 so that the video signals corresponding to the first image frame (i.e., the "combined" or "composite" pixel image signal lines outputted from, for example, the first ASP 16 and related to the signals outputted from the first line pixel register 60) are directed from terminal 27 to terminal 26 of the switch 18, and hence, to the input of the viewfinder display 20 to form a first display field therein. Upon a second transition 407 from the "high" level 402/1 to a "low" level 402/2, the switch 18 responds by "connecting" its input terminal 29 to the output terminal 28, hence directing the video signals corresponding to the second image frame (i.e., the "combined" pixel image signal lines outputted from the second line pixel register 59 via the ASP 17) as a second display field to the display 20. Under control of the sync and control signals provided to the display 20 via the cable 44, a display frame (first plus interlaced second display fields) is formed in 1/30 of a second (or at a frame rate of 30 display frames per second in accordance with the NTSC standard).

The first and second transitions (of the DF signal 400) 405 and 407, respectively, as well as a last transition 409 are shown to occur synchronized at the approximate center of each one of the V3 pulses in FIG. 9.

It should be noted that the multiplexer switch 18 is non-functional and, alternatively, disconnected from the outputs of the analog signal processors ASP 16 and ASP 17 when the high resolution CCD image sensor 12 is operated in the high resolution mode.

Figure 10:
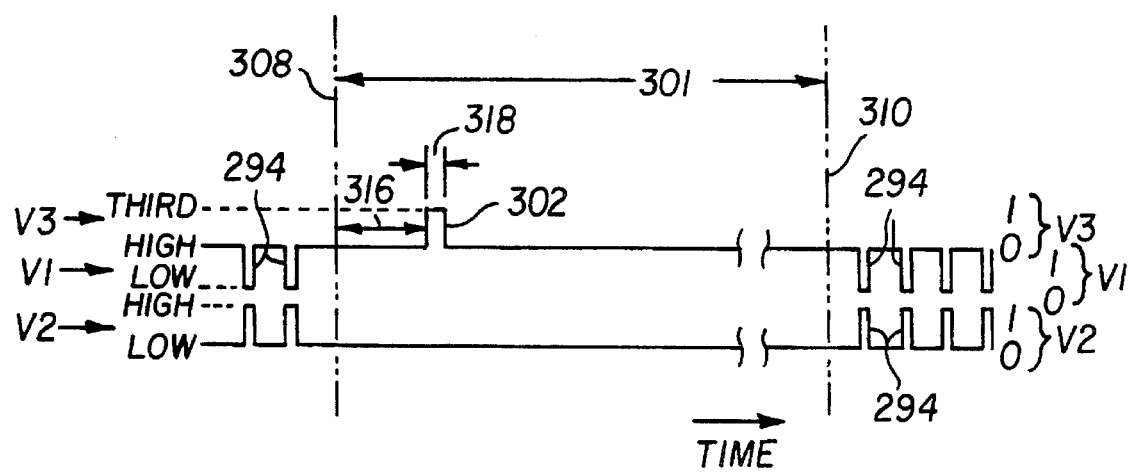
FIG. 10 shows an enlarged portion of the vertical control signals of FIG. 9 and schematically illustrates their temporal relationship to each other.

Referring now to FIG. 10, there are schematically shown, the beginning of a portion of the vertical control signals V1 and V2 which are shown enlarged as compared to FIG. 9. A frame shift pulse 302 of the vertical control signal V3 is also shown in relation to the signals V1 and V2. Time (not exactly to scale) is indicated along the horizontal axis and signal logic levels of "0" and "1" and combined levels illustrating "low", "high" and "third" logic levels are indicated along the vertical axis. After the last vertical shift pulse 294 in a preceding image frame portion there is the blanked-out time interval 301 (see also FIG. 9) at the beginning of the next image frame of the vertical control signals V1 and V2. The blanked-out interval 301 (selectably determined by the timer 78 as will be explained shortly) begins at a time indicated by a vertical line 308 and ends at a time indicated by a dashed vertical line 310. During the blanked-out interval 301, the vertical sync pulses 294 are eliminated from the vertical control signals V1 and V2. Each blanked-out interval 301 is precisely referenced to the HD signal (lead 104) and to the VDF signal (lead 107) as will be explained shortly.

A frame shift pulse 302 of the vertical control signal V3 is shown for the sake of explanation superimposed on the vertical control signal V1. The pulse 302 begins a short interval, indicated by 316, after the beginning at the time 308 of the blanked-out interval 301. The duration of the pulse 302 is indicated by 318. The generation by the timing logic system 14 of the frame shift pulses 302 of the vertical control signal V3, and the blanked-out interval 301 of the vertical control signals V1 and V2 will be described in detail hereinafter.

The presence of the frame shift pulse 302 of the vertical control signal V3 in effect provides, as shown here, a "third" signal logic level in addition to the two logic levels "low" and "high" of the vertical control signal V1 by itself. This permits the drive circuits (not shown) within the CCD image sensor 12 to recognize each frame shift pulse 302 of the vertical control signal V3 as a command to shift all of the lines of pixel image signals from the cells 50 of a vertical frame into the vertical shift registers 54.

In the high resolution mode of operation, the duration of the blanked out intervals 301 (upper portion of FIG. 9) is chosen as twenty-six pixel line times (26H). This duration of 26H is determined by a first selected signal (not shown) from the timer 78. Making each one of the 26H line time intervals 301 equal to (26H), the sum of the 26H line time plus the time of the 1024 lines of the high resolution CCD image sensor 12 in the example given here, accounts for a total time duration equivalent to the total number of lines of two standard television frames at 525 lines/frame. However, it should be pointed out that in the high resolution mode of operation of the high resolution CCD image sensor 12, the analog video signals (at the output of each one of ASP 16 and ASP 17) corresponding to one line of pixel image signals outputted from each one of the two line pixel registers (A) 60 and (B) 59, respectively, are not displayed on a television display in accordance with a television standard. Rather, the output of each one of the ASP 16 and ASP 17 is supplied to a separate one of two inputs (via the leads 30 and 32, respectively, in FIG. 1) of the high resolution picture unit 24 (which may include an A/D converter and signal storage means associated with each input). Nonetheless, each one of the two inputs (30, 32) of the high resolution picture unit 24 receives the "equivalent" of 525 lines of the ("26H-adjusted") 1050 lines per image frame of the image sensor 12.

In the television resolution mode of operation (in which the video signals are displayed on a television-standard viewfinder display or on a conventional television set), the duration of the blanked-out interval 301A (lower portion of FIG. 9) is chosen as six-pixel line times (6H). This duration of 6H is determined by a second selected signal (not shown) from the timer 78. Making each one of the blanked-out intervals 301A equal to 6H, the sum of the 6H line times plus the time-corresponding to the 256 "quadruple lines" (the 1024 lines of the high resolution CCD image sensor 12 shifted as two consecutive lines into one of the two line pixel registers, and the next two consecutive lines into another of the two line pixel registers), accounts for a total time duration equivalent to 262 lines which, in turn is substantially equivalent to the 262.5 lines of a first field (for example, an "odd" field) or of a second field (for example, an "even" field) of a standard television display having 525 lines per display frame (one first display field plus one "interlaced" second display field) in accordance with the NTSC standard.

The frame shift pulse 302 (and also the pulse 302A) of the vertical control signal V3 begins about two line-times (interval 316) after the blanked-out interval 301 begins (see FIG. 10). The pulse 302 (and the pulse 302A) has a duration of about one line-time.

In the television resolution mode of operation of the high resolution CCD sensor 12 illustrated in the lower portion of FIG. 9, vertical pulses 294A which occur after each blanked-out interval 301A ends, occur at the precise time required (see FIG. 4) for synchronized viewing on the television viewfinder display 20 in an "interlaced" format of the first ("odd") and second ("even") display fields of "composite" video signals from the CCD image sensor 12 via the ASP 17 and the multiplexer switch 18 (for example, for the first or "odd" display field) and, alternatively via the ASP 16 and the multiplexer switch 18 (for example, for the second or "even" display field).

The logic/counter 80 (FIG. 2) is selectably (via the mode selector 6) set to generate, during both the high resolution mode and the television resolution mode of operation, a single pulse 226 (or 226A) of the VDF signal (lead 107) in response to every other one of the pulses 212 of the VD signal (as shown in FIG. 9). The timer 78 responds to each VDF signal pulse 226, or pulse 226A, and, generates a signal on the lead 112 corresponding to the blanked out intervals 301 ("26H") or the shorter blanked-out intervals 301A "6H").

The complementary vertical control signals V1 and V2 (leads 38 and 39 of FIG. 1) of FIG. 7A and 7B or alternatively of FIG. 9 are selectably generated by the logic unit 84 from a logical combination of the timed pulses 294 generated by the astable timer 74 (lead 114) controlled by the logic unit 84 via the lead 115, and a signal (not shown) selectably generated by the timer 78 (lead 112) and having a duration equal to the blanked-out interval 301 "26H") or the blanked-out interval 301A "6H") (FIG. 9). The "first" and "second" display field control signals 402/1 and 402/2 (lead 35) applied to the control terminal 25 of the multiplexer switch 18 are generated by the logic unit 84 from a logical combination of the pulses FLD pulses provided by the standard timing generator 70 via lead 108 and an output signal of timer 78 provided to the logic unit 84 via the leas 112 (FIG. 2).

The 4-bit counter 81 is enabled by the signal (not shown but lasting for the interval 301 or 301A) generated by the timer 78 on the lead 112. Thereafter, in response to the HD signal on the lead 104, the 4-bit counter 81 generates binary bit pulses (not shown) representing "one", "two", "four" and "eight" line-times on the respective leads 120, 121,122 and 123. The logic unit 86 receives these binary bit pulses (not shown) and logically combines them. In response to its input signals, the logic unit 86 generates the frame shift pulses 302 (or pulses 302A) of the vertical control signal V3 and applies them to the lead 40. The timing and referencing of the frame shift pulses 302 (or 302A) of the vertical control signal V3, and the blanked-out intervals 301 (or 301A) of the complementary vertical control signals V 1 and V2 have been described previously (FIGS. 8, 9, and 10).

The seemingly complex task of generating "standard" (NTSC) sync and control signals needed by a television viewfinder or by a standard television set with a limited number of lines per display frame on the one hand, and the generating of precisely referenced horizontal and vertical control signals needed by a high resolution CCD image sensor of the type having two line pixel registers and having a much larger number of lines per image frame for a high resolution mode of operation on the other hand, is accomplished in a simple and highly effective way by the above described timing logic system and method provided in accordance with the present invention. The timing logic system 14 is controlled in absolute synchronism by a single frequency generator 64 operating at a predetermined multiple of a standard frequency sub-carrier "fsc". A generic television-standard timing generator 70 operates at a multiple (e.g., 4) of the "fsc" to produce standard sync and control signals for a conventional television system. The pixel clock generator 66 generates a (horizontal) pixel clock 290 having a number of pixel timing pulses 292 per cycle selected in accordance with the particular CCD image sensor 12 used with the timing logic system 14. The HD signal, the FDL signal, and the VD signal from the television-standard timing generator 70, and the pixel clock from the pixel clock generator 66 are then applied to another portion (comprising a small number of inexpensive components which may be purchased off-the-shelf) of the timing logic system 14. This portion of the timing logic system 14 selectably generates the horizontal and vertical control signals needed by the high resolution CCD image sensor 12 for a high-resolution mode of operation. Alternatively, for a television resolution mode of operation, the timing logic system 14 selectably generates the horizontal and vertical control signals and a display field control signal DF which is applied to a multiplexer switch to control the display of a first display field and the display of a second "interlaced" display field to form a television display frame in accordance with a television standard. These horizontal and vertical control signals and display field control signals are inherently referenced to and synchronized with a television standard (e.g., NTSC). There is no redundancy of elements in this new timing logic system 14 and thus it is highly cost effective.

A mode selector means 6 selectably provides to the timing logic system 14 control signals which make the timing logic system operative to generate output signals for controlling the high resolution CCD image sensor 12 of FIG. 1 in the high resolution mode and alternatively in the television resolution mode of operation.

The generic television-standard timing generator 70 can be Part No. CX-7930A NTSC, PALM, sold by Sony Corporation. It provides output sync and control signals in accordance with the NTSC standard, and also the PAL standard. The timers 72, 73, astable timer 74, and timers 76 and 78 are commercially available, for example, as part Number 74HC123 from Texas Instruments Co.. The logic/counter 80 and logic units 82, 84 and 86 comprising logic gates, counters and inverters are commercially available, for example, from Texas Instruments (such as part numbers 74HC00, 74HC04, 74HC08, and 74HC32). The pixel clock generator 66 is a commercially available pulse generator. The various other components employed in the timing logic system 14 are well known in the art and are commercially available from a number of suppliers.

Various changes in the disclosed timing logic system and method for controlling therewith a high resolution CCD image sensor of the type having two line pixel registers may be contemplated by those skilled in this art and can be made without departing from the spirit and scope of the invention as set forth in the accompanying claims. For example, the invention is not limited to a particular number of horizontal lines (e.g., 1024) in a high resolution CCD image sensor, or to a given television standard (e.g., NTSC), or to the particular components of the logic system 14 which have been specifically described. Still further modifications in the sequences of generating the horizontal control signals, the vertical control signals, and the display field control signals for the CCD image sensor 12 by the timing logic system 14 may be made without departing from the invention.

| PARTS LIST | |
|---|---|
| 6 | mode selector |
| 7 | high resolution mode input lead |
| 8 | television resolution mode input lead |
| 9 | mode selector output lead |
| 10 | video imaging system |
| 12 | CCD image sensor |
| 14 | timing logic system |
| 16 | analog signal processor (ASP) |
| 17 | analog signal processor (ASP) |
| 18 | multiplexer switch |
| 20 | viewfinder display (television standard) |
| 24 | high resolution picture unit |
| 25 | control input terminal |
| 26 | output terminal |
| 27 | input terminal |
| 28 | lead (to display 20) |
| 29 | input terminal |
| 30 | lead (to picture unit 24) |
| 32 | lead (to picture unit 24) |
| 35 | lead ("fld") |
| 36 | lead (H1B) |
| 37 | common lead |
| 38 | lead (V1) |
| 39 | lead (V2) |
| 40 | lead (V3) |
| 44 | multi-channel cable |
| 42 | lead (H1A) |
| 46 | lead (to ASP 16) |
| 47 | lead (to ASP 17) |
| 50 | cells of image sensor 12 |
| 52 | first horizontal line of cells 50 |
| 52a | first horizontal line of cells 50 of a first image frame |
| 52b | first horizontal line of cells 50 of a second image frame |
| 53 | last horizontal line of cells 50 |
| 54 | vertical shift register |
| 56 | direction of signal shifting into a first line pixel register (A) |
| 59 | second line pixel register (B) |
| 60 | first line pixel register (A) |
| 61 | direction of signal shifting from the first to the second line pixel register (B) |
| 64 | frequency generator |
| 66 | pixel clock generator |
| 70 | generic television-standard timing generator |
| 72 | timer |
| 73 | timer |
| 74 | astable timer |
| 76 | timer |
| 78 | timer |
| 80 | logic/counter |
| 81 | 4-bit counter |
| 82 | logic unit |
| 84 | logic unit |
| 86 | logic unit |
| 90 | lead ("FSC") |
| 92 | lead ("FSC") |
| 102 | lead (pixel clock) |

31
-continued

PARTS LIST

| | |
|---|---|
| 104 | common lead (HD) |
| 106 | lead (VD) |
| 107 | lead (VDF) |
| 108 | lead (FLD) |
| 110 | common lead |
| 112 | common lead |
| 113 | lead |
| 114 | lead |
| 115 | lead |
| 117 | lead |
| 118 | lead |
| 120 | lead |
| 121 | lead |
| 122 | lead |
| 123 | lead |
| 150 | television signals |
| 151 | "odd" field of signal 150 |
| 152 | "even" field of signal 150 |
| 153 | "vertical blank" interval |
| 154 | "vertical blank" interval |
| 156 | twenty-first horizontal line of an "odd" field |
| 158 | one half of a horizontal line |
| 160 | video portion of signal 150 |
| 161 | one half of a horizontal line |
| 162 | twenty-first horizontal line of an "even" field |
| 164 | ending horizontal line of an "even" field |
| 168 | horizontal line sync pulse |
| 170 | enlarged portion of waveform of signal 150 |
| 172 | time duration of one horizontal line |
| 174 | "horizontal blank" (HBLK) interval |
| 176 | combined pulse |
| 178 | a level of pulse 176 |
| 179 | transition |
| 180 | sync pedestal |
| 182 | oscillating portion (BF) |
| 184 | active portion |
| 200 | sync pulse series |
| 204 | blanking interval |
| 206 | transition |
| 208 | first level of vertical drive (VD signal) |
| 210 | transition |
| 211 | second level of vertical drive (VD) signal |
| 212 | pulse |
| 214 | transition |
| 218 | first level of field indicator (FLD) signal |
| 220 | first transition |
| 222 | second level of field indicator (FLD) signal |
| 224 | second transition |
| 226 | signal pulses (VDF) |
| 226A | signal pulses (VDF) |
| 250 | first level of a sync pulse 200 |
| 252 | second level |
| 254 | transition |
| 256 | transition |
| 260 | timed pulse |
| 262 | transition |
| 264 | transition |
| 270 | timed pulse |
| 273 | transition |
| 274 | transition |
| 280 | blanked-out portion of horizontal control signals H1B and H2 (high resolution mode) |
| 282 | blanked-out portion of horizontal control signals H1B and H2 (television resolution mode) |
| 290 | horizontal pixel clock |
| 291 | transition of vertical (V1, V2) control signal pulses |
| 292 | timing pulse (horizontal pixel clock) |
| 293 | period of a timing pulse |
| 294 | vertical (V1, V2) control signal pulses |
| 294A | vertical (V1, V2) control signal pulses |
| 294/1 | first vertical (V1, V2) control signal pulse |
| 294/2 | second vertical (V1, V2) control signal pulse |
| 294/3 | third vertical (V1, V2) control signal pulse |
| 294/4 | fourth vertical (V1, V2) control signal pulse interval |
| 295 | transition of vertical (V1, V2) control signal pulses |

32
-continued

PARTS LIST

| | |
|---|---|
| 296 | line pixel register shift pulse |
| 297 | transition |
| 298 | transition |
| 299 | timed pulse (at output of a timer 76) |
| 300 | vertical clock (high resolution mode) |
| 300A | vertical clock (television resolution mode) |
| 301 | blanked-out portion of vertical clock 300 |
| 301A | blanked-out portion of vertical clock 301 |
| 302 | frame shift pulse (V3; high resolution mode) |
| 302A | frame shift pulse (V3; television resolution mode) |
| 308 | vertical line (start of blanked-out vertical clock portion) |
| 310 | vertical line (end of blanked-out vertical clock portion) |
| 316 | interval |
| 318 | pulse duration (V3 frame shift pulse 302) |
| 400 | display field control signal (DF) |
| 402/1 | first level (first display field) |
| 402/2 | second level (second display field) |
| 405 | transition |
| 407 | transition |
| 409 | transition |
| "a" | first image frame (television resolution mode) |
| "b" | second image frame (television resolution mode) |
| (A) | line pixel register 60 |
| (B) | line pixel register 59 |
| BF | burst flag signal |
| DF | display field control signal |
| "EVEN"; "even" | television-standard display signals |
| "EVEN FIELD" | television-standard display field |
| FLD | field indicator signal |
| "FSC"; "fsc" | standard frequency sub-carrier |
| H | horizontal line |
| H1A | horizontal control signal |
| H1B | horizontal control signal |
| H2 | horizontal control signal |
| HBLK | horizontal blank signal |
| HD | horizontal drive signal |
| "HIGH" | high signal level (a logic level "1") |
| "LOW" | low signal level (a logic level "0") |
| NTSC | national television standards committee |
| "ODD"; "odd" | television-standard display signals |
| "ODD FIELD" | television-standard display field |
| SYNC | synchronizing signal |
| "T" | time interval |
| "THIRD" | third logic level (V3 on V1) |
| V1 | vertical control signal |
| V2 | vertical control signal |
| V3 | vertical control signal |
| VBLK | vertical blank signal |
| VD | vertical drive signal |
| VDF | output signal (from logic/counter 80) |

What is claimed is:

1. A timing logic system for generating synchronizing (sync) and control signals in accordance with a television standard and for selectably generating horizontal, vertical, and display field control signals as required by a high resolution charge coupled device (CCD) image sensor of the type having two line pixel registers and having a large number of horizontal lines of pixel image signals per vertical image frame for a high resolution mode of utilizing all of the lines of pixel image signals in a high resolution picture unit and alternatively for a television resolution mode of utilizing alternate pairs of consecutive lines of pixel image signals from each one of two consecutive vertical image frames for direct viewing on a standard television display, the timing logic system comprising:

timing generator means for generating standard sync and control signals in accordance with the television standard, the timing generator means being referenced to a standard frequency;

pixel clock generating means for providing pixel clock signals having repeating cycles each of which has a pre-determined number of pixel timing pulses in accordance with requirements of the CCD image sensor, the pixel clock generating means being referenced to the standard frequency; and selectably controlled timing and logic means, which is driven by the pixel clock and standard sync and control signals, for generating the horizontal, vertical, and display field control signals for the CCD image sensor for the high resolution mode of utilizing all of the horizontal lines of pixel image signals of the vertical frame from the CCD image sensor and including mode selector switch means for the television resolution mode of utilizing alternate pairs of consecutive horizontal lines of pixel image signals from each one of two consecutive image frames to form interlaced first and second display fields of vertical display frames of the standard television display in which the first and the second display fields are selected by said mode selector switch means controlled by the display field control signals.

2. The timing logic system of claim 1 wherein the selectably controlled timing and logic means comprises:

a plurality of timers adapted to provide respective pulses of pre-determined durations referenced to ones of the standard sync and control signals;

first logic means for generating three of the horizontal control signals from a logical combination of the pixel clock and at least one of the respective pulses;

second logic means for selectably generating the vertical control and display field control signals from a logical combination of ones of the respective pulses and the standard sync and control signals; and third logic means for selectably generating frame shift vertical control signals from a logical combination of others of the respective pulses.

3. The timing logic system of claim 2 wherein the timing generator means operates in accordance with a national television standards committee (NTSC) standard requiring 525 horizontal lines of a vertical display frame in interlaced first and second fields, and the CCD image sensor has 1024 horizontal lines of pixel image signals; and the timing and logic means are selectably controlled to utilize all 1024 of the horizontal pixel image lines of the vertical image frame of pixel image signals from the CCD image sensor, and alternatively to utilize interlaced display fields having 256 alternate pairs of pixel image lines from the CCD image sensor in each one of a first and a second display field of the television standard.

4. The timing logic system of claim 1 wherein the selectably controlled timing and logic means comprises:

a plurality of timers adapted to generate timer signals having respective durations and being referenced to ones of the timer signals and the standard sync and control signals, at least one of the timer signals being selectable in duration and another timer signal being logically controlled to select a temporal position of a single line pixel register shift pulse signal of one of three horizontal control signals;

first logic means for generating the three horizontal control signals from a logical combination of the pixel clock and at least one of the timer signals;

second logic means for selectably generating the vertical control signals and the display field control signal from a logical combination of ones of the timer signals and the standard sync and control signals; and third logic means for selectably generating frame shift vertical control signals from a logical combination of the timer signal and the standard sync and control signals;

thereby controlling the temporal relationships of the three horizontal control signals, the line pixel register shift pulse signal, the vertical control signals and the frame shift vertical control signals in a high resolution line-by-line readout mode of all of the horizontal lines of pixel image signals from the vertical image frame of the CCD image sensor and alternatively controlling the temporal relationships of the three horizontal control signals, the line pixel register shift pulse signal, the vertical control signals, the frame shift vertical control signal and the display field control signal in a television resolution readout mode of alternate pairs of the horizontal lines of pixel image signals from each one of two consecutive vertical image frames of the CCD image sensor as the interlaced first and second display fields of the standard television display.

5. A timing logic system for generating standard synchronizing (sync) and control signals in accordance with a television standard and for generating horizontal and vertical control signals required by a high resolution charge coupled device (CCD) image sensor of the type providing horizontal lines of pixel image signals of vertical image frames from two line pixel registers for alternative modes of operation, the timing logic system comprising:

a frequency generator adapted to provide signals referenced to a standard television frequency sub-carrier (fsc);

a television-standard timing generator adapted to be driven by a signal from the frequency generator and adapted to provide the standard sync and control signals in accordance with the television standard;

a plurality of timers adapted to generate signals having respective durations and being precisely referenced to each other and to ones of the standard sync and control signals;

a pixel clock generator adapted to generate a pixel clock, the pixel clock generator being adapted to be driven by a signal from the frequency generator; and a plurality of logic units adapted to generate horizontal, horizontal line pixel register shift, vertical, and vertical frame shift CCD control signals and display field control signals from a logical combination of respective ones of the pixel clock, timer signals, and the standard sync and control signals;

thereby controlling selected ones of the timers and the logic units to provide for a high resolution mode of operation of the CCD image sensor in which consecutive single horizontal lines of pixel image signals are outputted at the same time from each one of the two line pixel registers for each vertical image frame of a picture to a high resolution picture unit and to provide for a television resolution mode of operation of the CCD image sensor in which alternate pairs of consecutive horizontal lines of pixel image signals are outputted from a first one of the two line pixel registers for a first vertical image frame of the picture through a switch means controlled by a first one of the display field control signals to form a first display field of a standard television display, and are outputted from a second one of the two line pixel registers for a consecutive second vertical image frame of the picture through the switch means controlled by a second one of the display field control signals to form a second display field interlaced with the first display field of the television display.

6. The timing logic system of claim 5 in which the logic units generate a selectable number of vertical control signal pulses in one vertical control signal, generate a selectable number of vertical frame shift pulses in another vertical control signal, and in the television resolution mode of operation generate first and second sequences of the display field control signals, the numbers of the vertical control signal pulses, the vertical frame shift pulses and the display field control signals being selected in accordance with the desired television resolution mode and alternatively the high resolution mode of operation of the CCD image sensor.

7. The timing logic system of claim 5 in which:

the plurality of timers comprise first, second, third and fourth timers, and an astable timer operative under control of one of said plurality of logic units; and the plurality of logic units comprise first second and third logic units and a logic/counter.

8. The timing logic system of claim 7 wherein the astable timer is controlled by a signal selector in one of the logic units, and the logic/counter also controls a selectably controlled timer.

9. A method for controlling a high resolution CCD image sensor of the type having at least a pair of two line pixel registers and having a large number of horizontal lines of pixel image signals per image frame to obtain in a television resolution mode of operation a reduced number of lines of video signals synchronized in interlaced first and second display fields for display in accordance with a television standard and alternatively to obtain all of the lines of pixel image signals from the CCD image sensor outputted from the line pixel registers for utilization by a high resolution picture unit, the method comprising the steps of:

generating standard sync and control signals as required by a standard television display;

generating a pixel clock;

generating a plurality of timed pulses referenced to the standard sync and control signals;

generating three horizontal CCD control signals from a logical combination of the pixel clock and ones of the timed pulses;

generating vertical CCD control signals having a selectable number of vertical shift pulses from a logical combination of ones of the timed pulses;

generating line pixel register shift control signal pulses having a selectable temporal relationship to the vertical shift pulses from a logical combination of ones of the vertical shift pulses and the pixel clock;

generating vertical CCD control signals having a fixed number of frame shift pulses from a logical combination of ones of the timed pulses and the standard sync and control signals;

generating display field control signals for displaying of selected numbers of alternate pairs of consecutive horizontal lines of pixel image signals outputted from a first one of the two line pixel registers for a first vertical image frame of a picture through a switch means controlled by a first one of the display field control signals to form a first display field of the standard television display, and outputted from a second one of the two line pixel registers for a consecutive second vertical image frame of the picture through the switch means controlled by a second one of the display field control signals to form a second display field interlaced with the first display field of the television display, the display field control signals generated from a logical combination of ones of the standard sync and control signals and the timed pulses; and selecting the numbers of the vertical shift pulses and the temporal relationship thereto of the line pixel register shift control signal pulses in accordance with a high resolution mode of outputting single horizontal lines of pixel image signals from each one of the two line pixel registers of the CCD image sensor and alternatively selecting the numbers of the vertical shift pulses, the temporal relationship thereto of the line pixel register shift control signal pulses and the display field control signals in accordance with the television resolution mode of outputting the alternate pairs of consecutive lines of pixel image signals in the interlaced first and second display fields of the television standard.

* * * * *